United States Patent [19]

Belanger et al.

[11] Patent Number: 4,662,284

[45] Date of Patent: May 5, 1987

[54] AUTOMOBILE CONVEYOR

[75] Inventors: James A. Belanger, Northville; Robert Wentworth, Ann Arbor; James M. Lapham, Northville, all of Mich.

[73] Assignee: Belanger, Inc., Northville, Mich.

[21] Appl. No.: 813,328

[22] Filed: Dec. 24, 1985

Related U.S. Application Data

[63] Continuation of Ser. No. 498,254, May 26, 1983, Pat. No. 4,576,098.

[51] Int. Cl.[4] .................. B61B 13/12; B61B 10/04
[52] U.S. Cl. .................................... 104/172.3
[58] Field of Search .............. 104/117, 131, 172 B; 198/630

[56] References Cited

U.S. PATENT DOCUMENTS

| Re. 30,026 | 6/1979 | Hanna et al. | 104/172 B |
| 3,596,605 | 8/1971 | Shelstad | 104/172 B |
| 3,971,325 | 7/1976 | Evans | 104/172 B |
| 4,266,482 | 5/1981 | Barber | 104/172 B |
| 4,374,496 | 2/1983 | Hanna | 104/172 B |

FOREIGN PATENT DOCUMENTS 866104  4/1961  United Kingdom ............ 104/172 B

*Primary Examiner*—Randolph A. Reese
*Attorney, Agent, or Firm*—Cullen, Sloman, Cantor, Grauer, Scott & Rutherford

[57] ABSTRACT

An automobile conveyor having an endless conveyor chain within a framework having top plates to support the tire of an automobile and a plurality of roller dollies spaced along the length of the chain normally positioned for movement within the framework. Each of the roller dollies includes at least one upright mounting plate connected to the conveyor chain. The plate supports three equally spaced rollers which substantially form an equilateral triangle with one roller forming the vertex of the triangle and the other two rollers being coplanar forming the base of the triangle. The one roller is adapted to operatively engage to automobile tire with the other two rollers adapted for supported movement upon the top plates.

9 Claims, 22 Drawing Figures

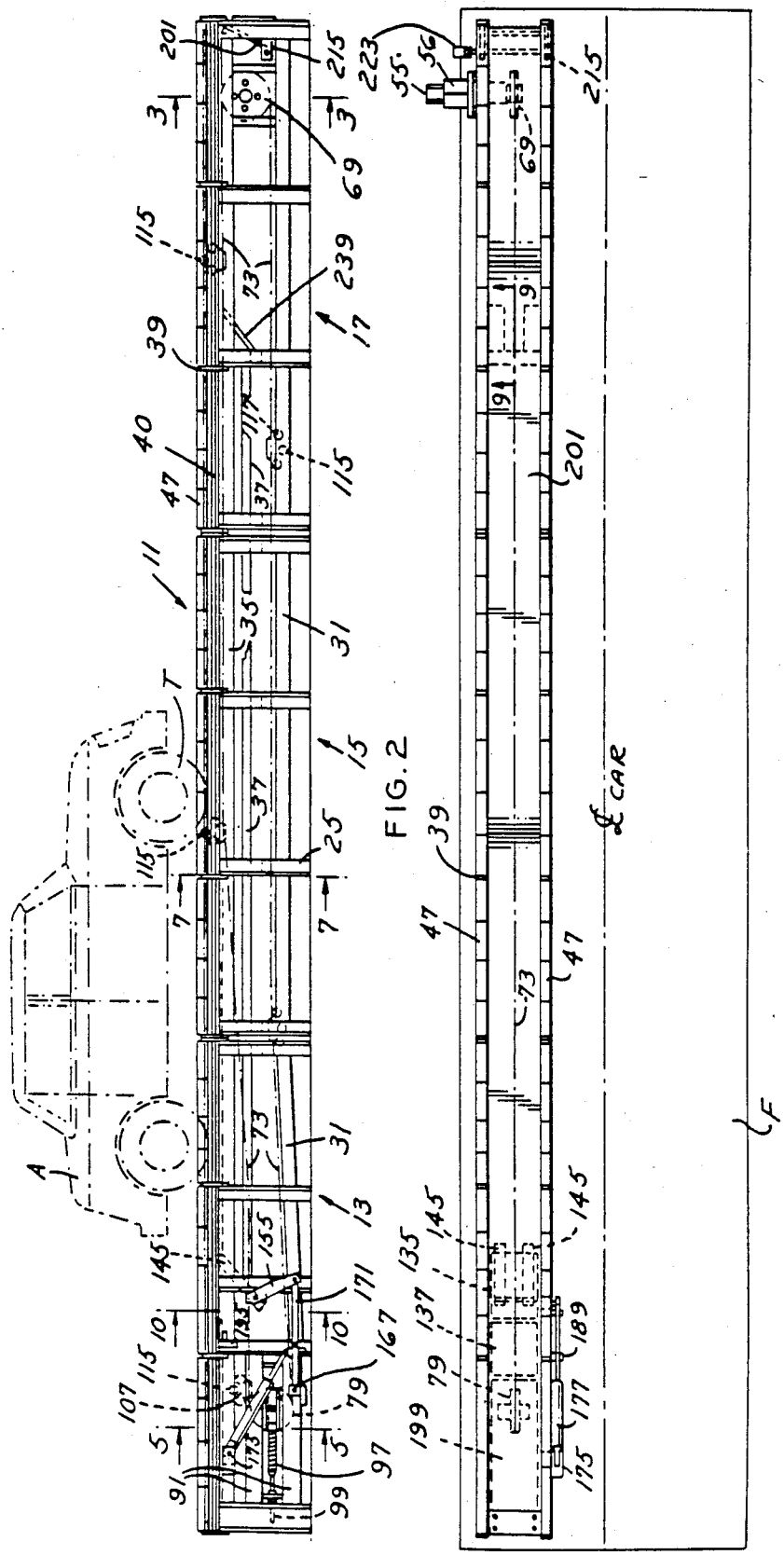

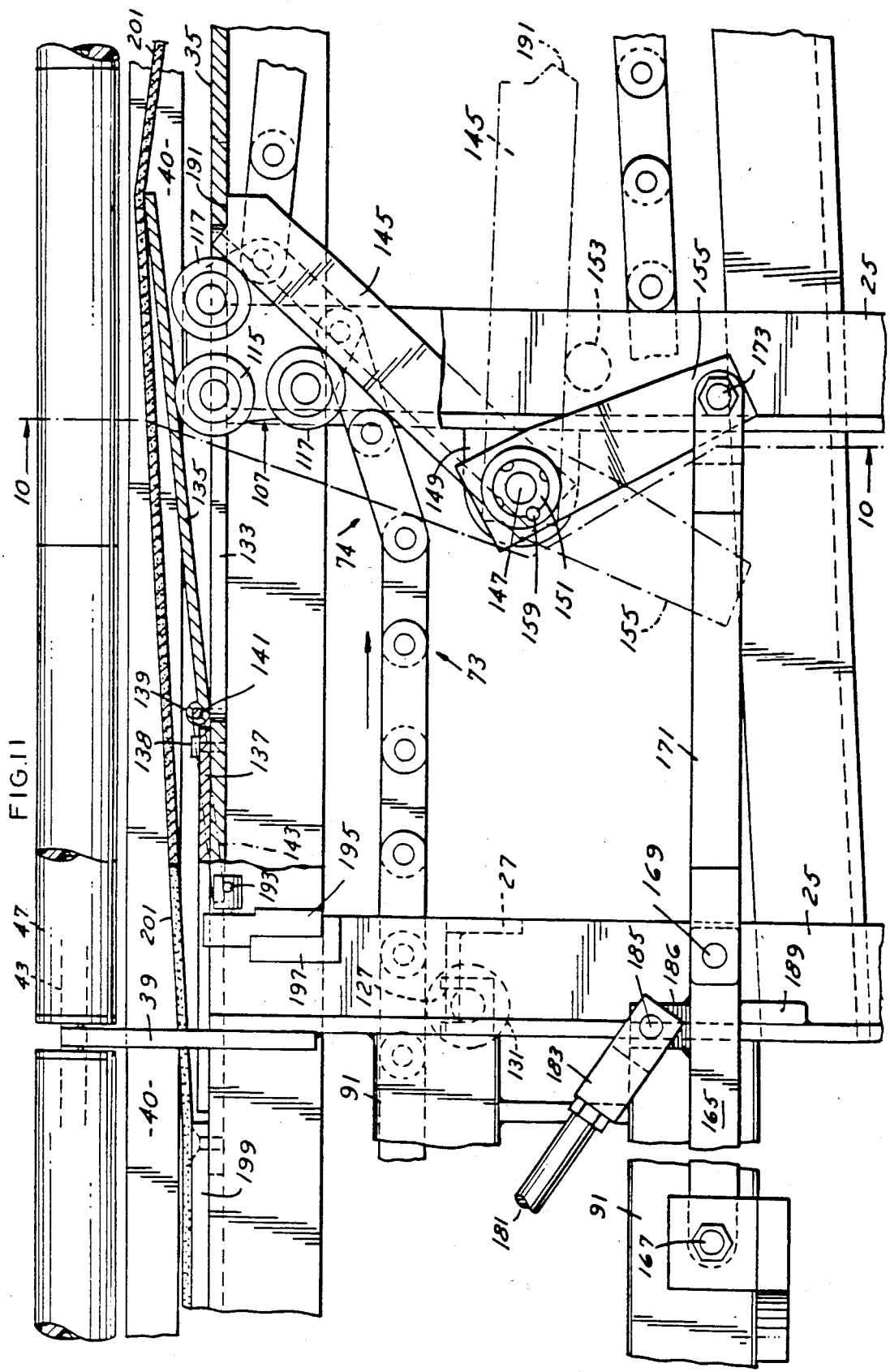

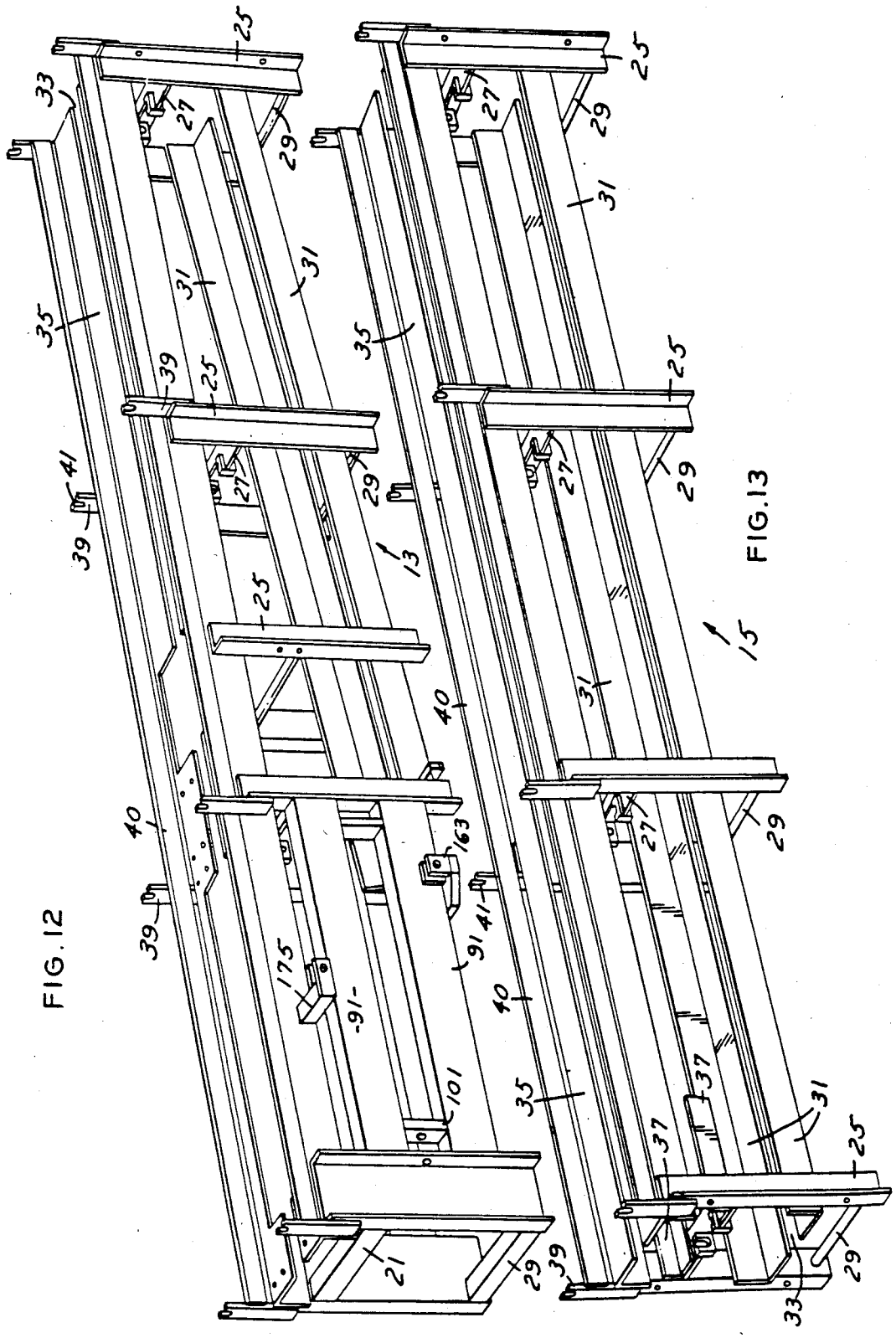

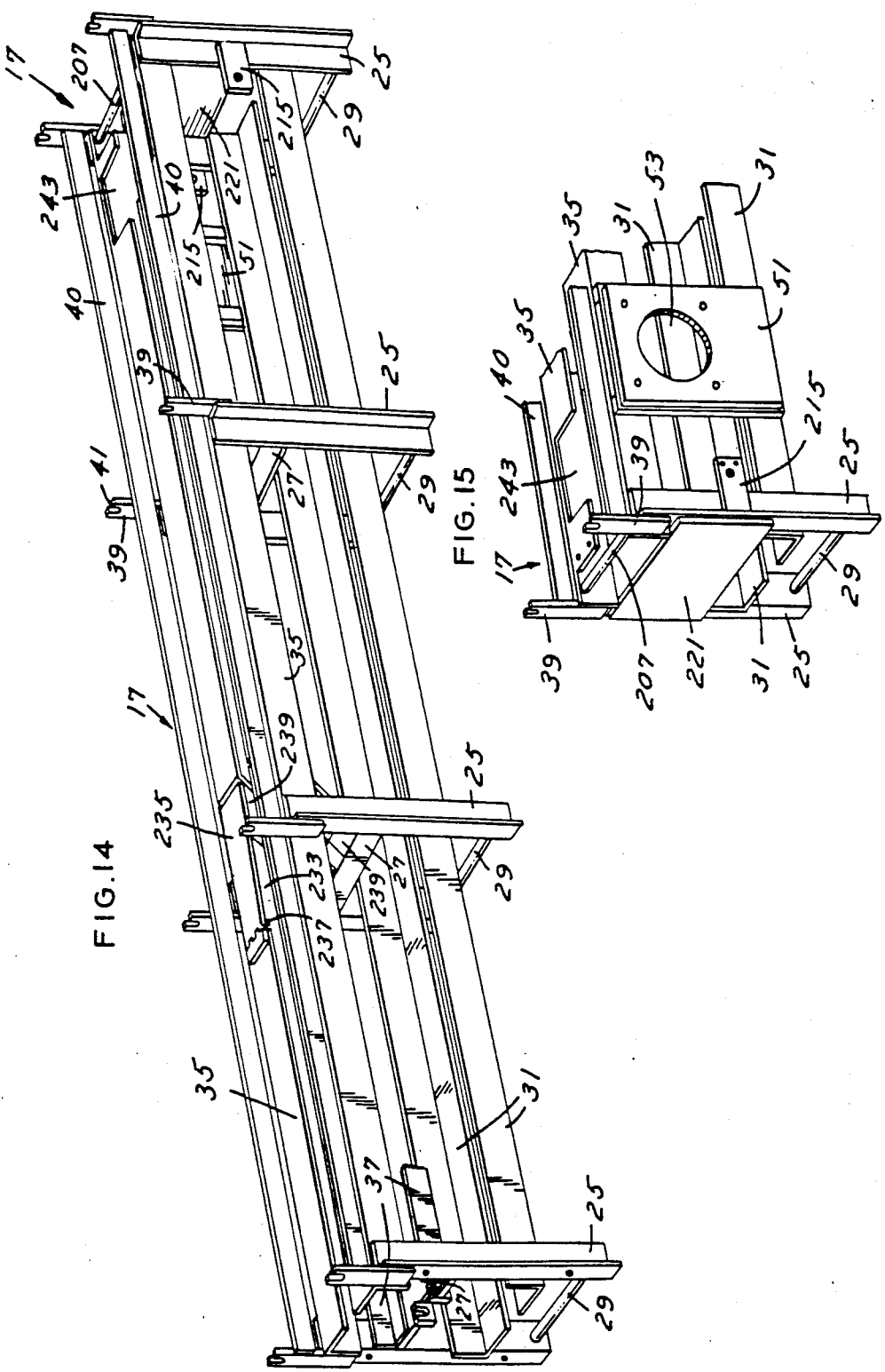

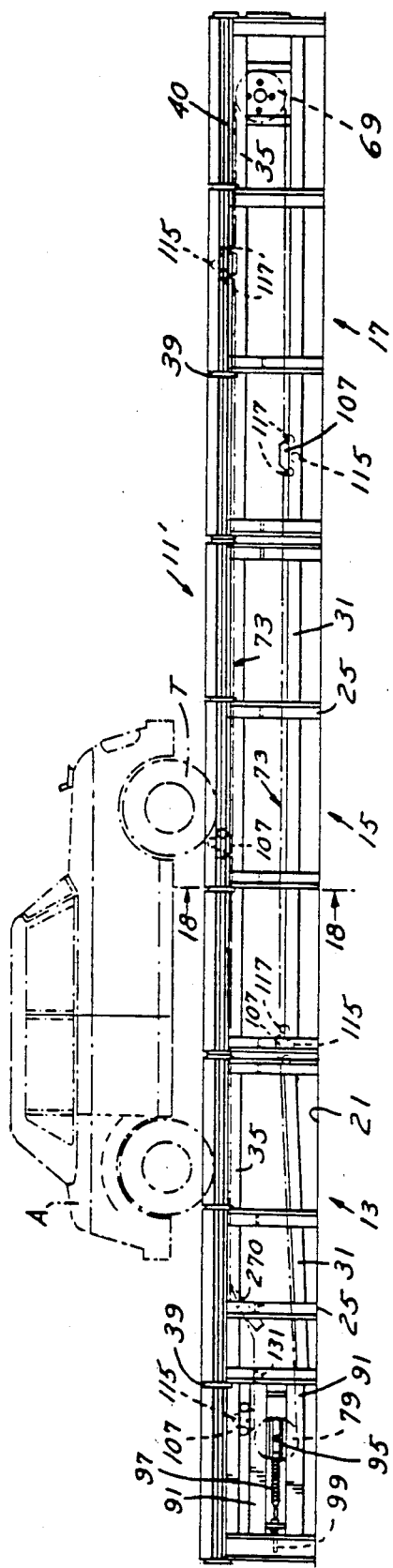
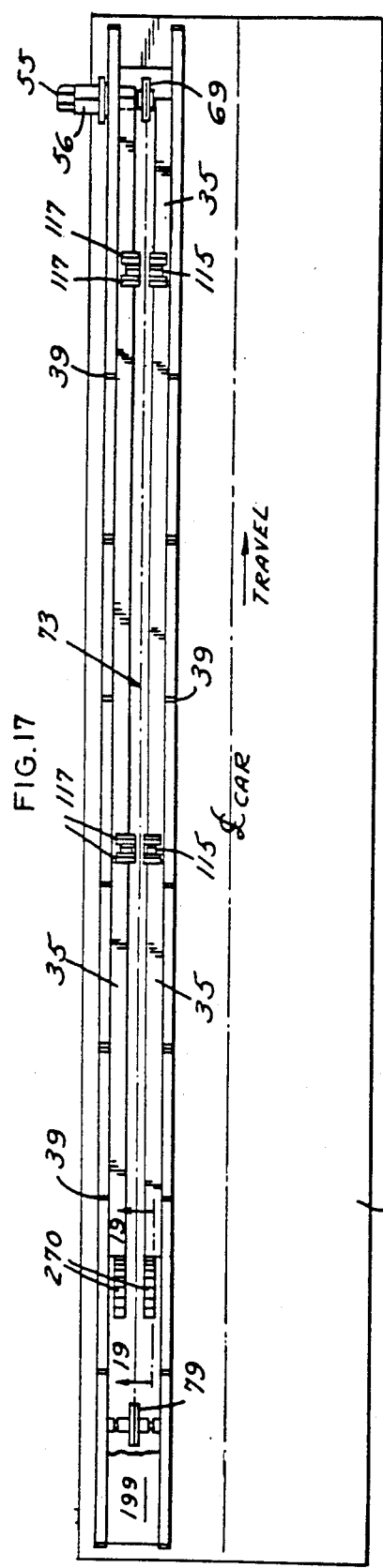
FIG.16
FIG.17

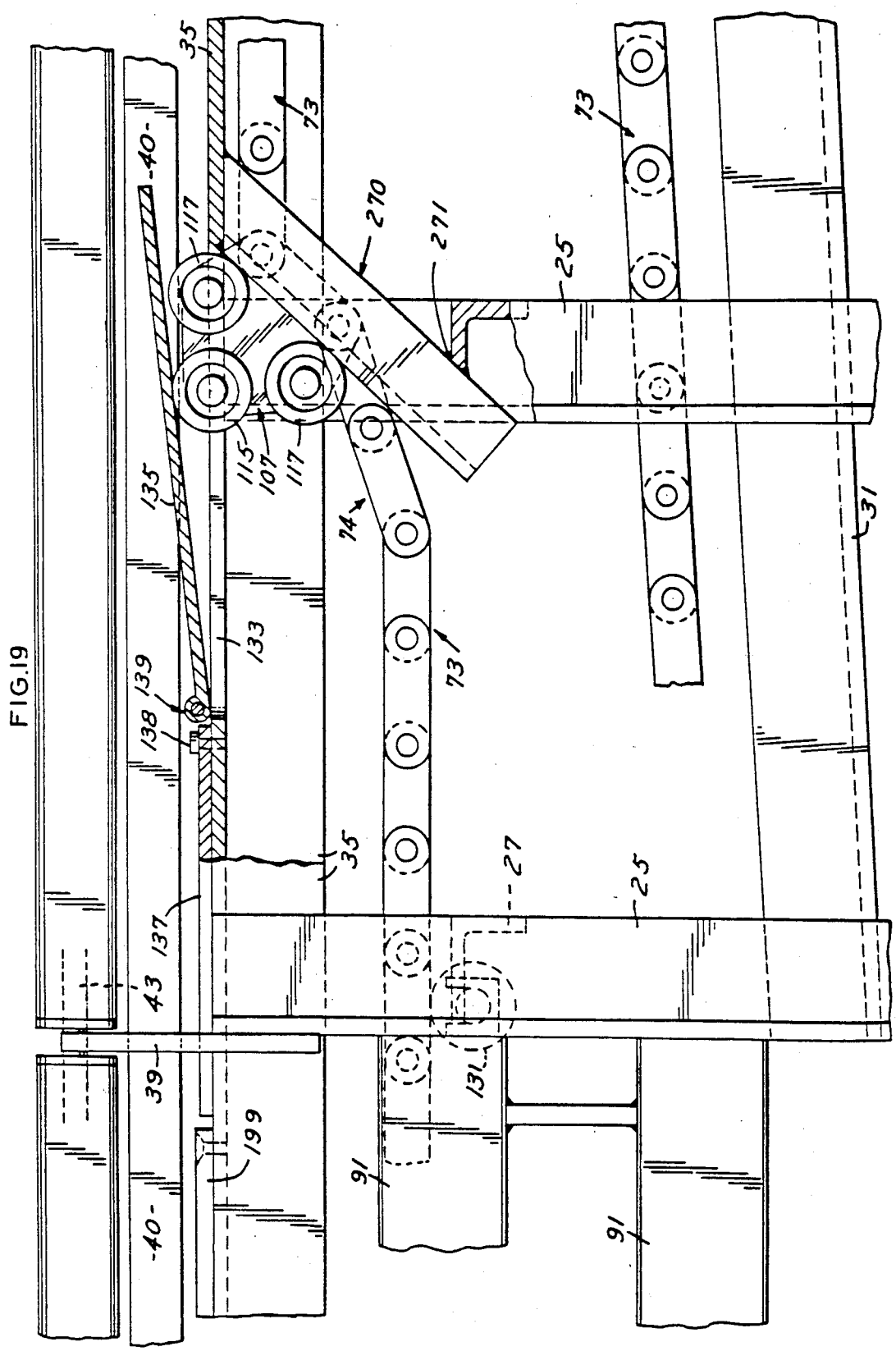

AUTOMOBILE CONVEYOR

This is a continuation of application Ser. No. 498,254 filed May 26, 1983 now U.S. Pat. No. 4,576,098.

BACKGROUND OF THE INVENTION

Heretofore various types of an endless conveyor have been used particularly in car washes, with the top flight of the conveyor having longitudinally spaced pusher dogs or other devices thereon adapted for operative pushing engagement with a vehicle tire or vehicle part for advancing the vehicle along a platform upon a framework which is usually flush with the ground surface.

Examples of such conveyors are shown in one or more of the following United States and foreign patents:

| U.S. PAT. NO. | DATE | NAME |
| --- | --- | --- |
| 795,124 | July 18, 1905 | F. V. Hetzel |
| 3,058,433 | October 16, 1962 | M. M. Hurst |
| Polish Pat. No. 49256 | May 6, 1964 | Adolf Hryniewiecki |
| 3,225,896 | December 28, 1965 | G. N. Krueger et al |
| 3,260,219 | July 12, 1966 | J. Vani |
| 3,329,255 | July 4, 1967 | R. Dulieu |
| 3,403,635 | October 1, 1968 | E. D. Smith |

In conveyors of this type, vehicle engaging assemblies have been mounted upon the sprocket chain having dogs or other movable members in a retracted and inoperative position. Some mechanism has been employed for moving the dogs to an active or operative position for engaging the tire of a vehicle located upon an overlying track or framework.

Examples in the prior art of such devices are as follows:

| U.S. PAT. NO. | DATE | NAME |
| --- | --- | --- |
| 3,554,133 | January 12, 1971 | Milo De Angelis |
| Re 30,026 | June 12, 1979 | Daniel C. Hanna |

SUMMARY OF THE INVENTION

An important feature of the present invention is to provide an automobile conveyor particularly useful for car washes, though not limited thereto, and where in a framework there is provided an endless sprocket chain conveyor assembly having thereon a series of longitudinally spaced roller dollies which for normal operation are movably positioned within the framework below a top platform over which a vehicle tire is adapted to advance and wherein there is provided an automatic vehicle device together with a programmable or programmably lifted power operated ramp or elevator guidably deflecting an advancing roller dolly selectively within the framework upwardly onto such platform for movement there-along for operatively engaging a vehicle tire and for movably advancing the vehicle along the platform.

A further feature contemplates the use of top plates upon the framework over which a vehicle tire advances, bottom plates within the framework guidably supporting dollies of the lower run of the sprocket chain, together with roller means within the framework between the top and bottom plates over which for normal operation the top run of the sprocket chain is guidably movable transporting the dollies connected thereto within the framework and below the top plates thereof.

A further feature contemplates the use of a programmable pivotal power operated ramp or elevator within the framework having a normal horizontal clearance position out of the path of forward movement of the upper flight of the conveyor chain and dollies. With such a construction and with a vehicle tire adjacent the framework, an operator actuates a control button effective to rotate the elevator ramp to an inclined position in the path of forward movement of the adjacent roller dolly so as to guidably deflect the dolly upwardly onto the top plates of the conveyor for pushing a vehicle tire thereover.

A further feature contemplates that of the plurality of roller dollies connected to the top flight of the conveyor sprocket chain, undeflected dollies connected hereto and the chain are movably positioned entirely within the framework along its length and wherein only the deflected dolly for pushing a vehicle tire simultaneously advances along the top plates of the framework.

A further feature contemplates that there be a fixed inclined ramp at the opposite end of the framework normally in the path of forward movement of the undeflected dollies for guidably deflecting such dollies so as to move upwardly onto the top plates of the framework prior to movement of the corresponding sprocket chain around a power driven sprocket at one end of the framework.

A further feature of the present invention requires the operator to actuate a control button when a vehicle is upon or adjacent the framework at the inlet end of the conveyor which is effective to control or operate a pneumatic mechanism for rotating the elevator ramp from a non-use horizontal clearance position to an inclined dolly deflecting elevating position by which a deflected roller dolly is elevated onto the top plates of the conveyor framework in a position to advance a vehicle tire thereon.

A further feature contemplates the yieldable mounting of the driven sprocket of the sprocket chain tensioning the same within the framework so as to respond to variations in the length of the sprocket chain determined by successive deflections of the roller dollies thereon onto the top plates of the conveyor wherein the remaining dollies remain guidably positioned within the framework.

A further feature contemplates the use of an elongated protective flexible belting which overlies the entire framework throughout its length, overlies the top plates thereon, the conveyor chain and roller dollies so as to form a personnel safety cover which helps to prevent a person's limb, foot or hand from becoming lodged in the conveyor. In addition the belting helps to exclude dirt and moisture from the interior of the conveyor assembly.

A further feature contemplates the use of the flexible belting so as to resiliently overlie the deflected roller dolly upon the top plates of the framework so as to have defined therein a transverse wave which advances along the length of the framework in operative pushing engagement with the adjacent vehicle tire.

Another feature of the present invention contemplates a pair of fixed inclined ramps at opposite ends of the framework in the path of movement of the dollies at all times as they move around the endless sprocket chain conveyor assembly.

These and other features will be seen from the following specification and claims in conjunction with the appended drawings.

THE DRAWINGS

FIG. 1 is a side elevational view of the present automobile conveyor as normally positioned within a pit over which an automobile tire is movably positioned.

FIG. 2 is a plan view of the automobile conveyor of FIG. 1.

FIG. 11 is a fragmentary section taken in the direction of arrows 11—11 of FIG. 10.

FIG. 12 is a side perspective view of the entrance section of the conveyor framework shown in FIG. 1.

FIG. 13 is a similar view of the intermediate framework section shown in FIG. 1.

FIG. 14 is a similar view of the exit framework shown in FIG. 1.

FIG. 15 is a fragmentary perspective view of the exit framework viewed from the exit end of the framework shown in FIG. 14.

FIG. 16 is a side elevational view of a modified automobile conveyor, similar to FIG. 1, and representing another and simplified embodiment of the present invention.

FIG. 17 is a plan view of the modified conveyor illustrated in FIG. 16.

FIG. 19 is a fragmentary side elevational view, partly in section, taken in the direction of arrows 19—19 of FIG. 17, and illustrating one of two stationary ramps employed at opposite ends of the conveyor.

Figure 3:
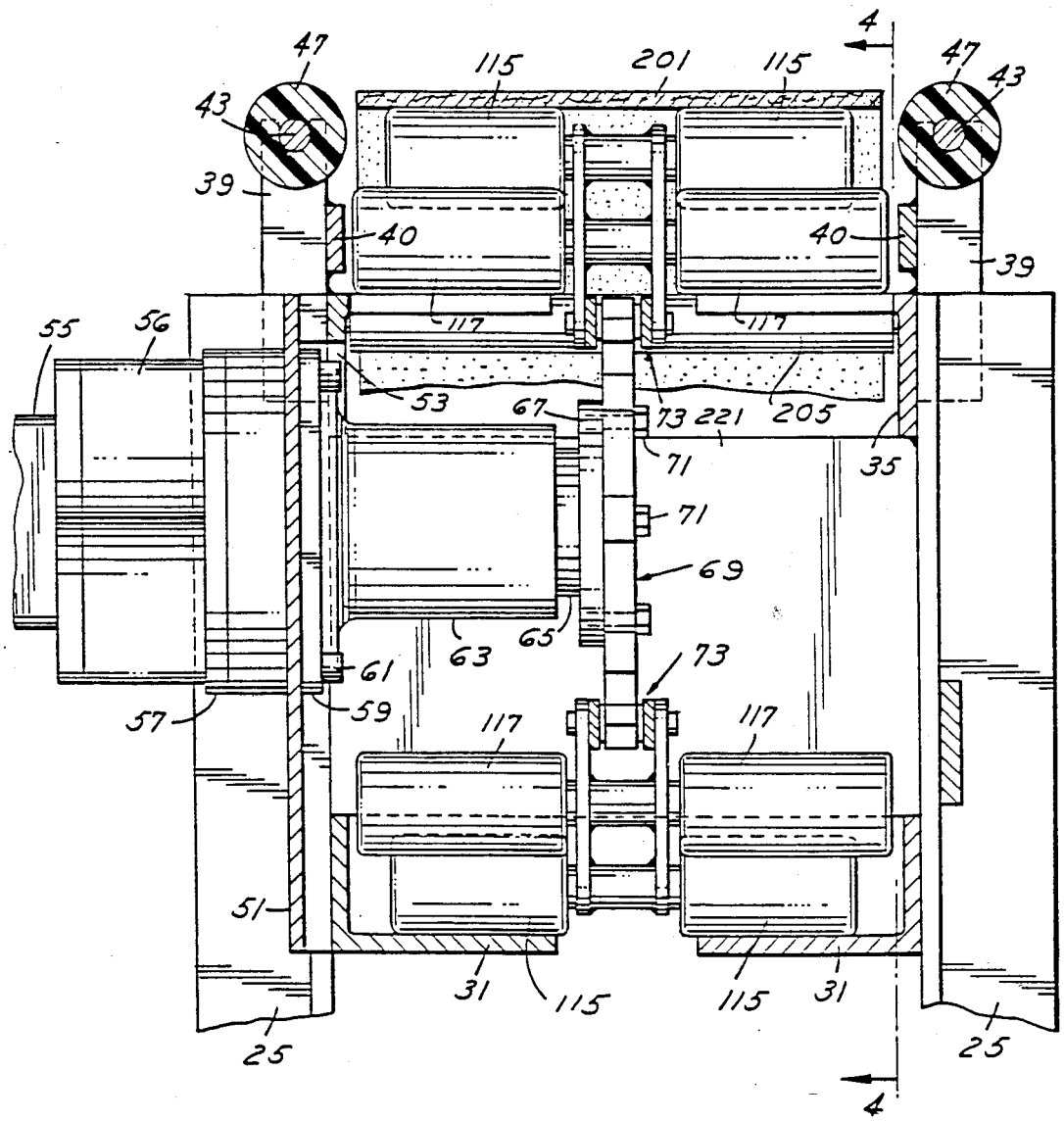
FIG. 3 is a fragmentary section taken in the direction of arrows 3—3 of FIG. 1, on an increased scale and illustrating the power drive for the sprocket chain and connected roller dollies.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Referring to the drawings, an automobile conveyor 11 is shown in FIGS. 1 and 2 over which is movably positioned an automobile A shown in dash lines having a tire T movably mounted upon top plates of the framework.

The present conveyor includes an entrance section 13, FIGS. 1 and 12, an intermediate section 15, FIGS. 1 and 13 and an exit section 17, FIGS. 1, 14 and 15. All sections are nested within a pit 21 having a floor and conventional side walls arranged adjacent a floor surface F shown in FIG. 2 over which vehicle A is movably positioned.

Entrance section 13, FIG. 12 includes a pair of opposed channel uprights 23 and longitudinally spaced therefrom, forming a part of the framework sections 13, 15 and 17, are opposed pairs of uprights 25 mounted upon the pit floor 21 as shown assembled in FIG. 1.

Spanning the respective uprights 23 and 25 are longitudinally spaced cross plates 27 intermediate the top and bottom of the framework. The lower ends of the uprights 23-25 are interconnected by cross members or rods 29.

Each of the framework sections 13, 15 and 17 include along their opposite sides and interconnecting the uprights 23-25 opposed bottom support angles 31 sometimes referred to as bottom plates or bottom support plates spaced apart throughout the length of the framework as shown at 33 (FIG. 12) providing a clearance for the centrally arranged endless sprocket chain 73.

Extending along the upper portions of the framework including the sections 13, 15 and 17 are the opposed spaced top support angles 35, sometimes referred to as spaced top plates similarly spaced apart as shown at 33 (FIG. 12) over which is movably positioned the tire T of the automobile A for transfer thereover. Arranged upon opposite sides of the framework, and fragmentarily shown in FIG. 13 are opposed angles 37 which extend between corresponding cross plates 27 supporting the same upon the framework between the uprights 23, 25.

Mounted upon the upper ends of the respective uprights 23, 25 are opposed spaced pairs of rod supports 39 longitudinally interconnected upon opposite sides of the framework throughout the length thereof by the reinforcement plates or toe guard 40. The supports have upwardly opening notches 41.

Figure 7:
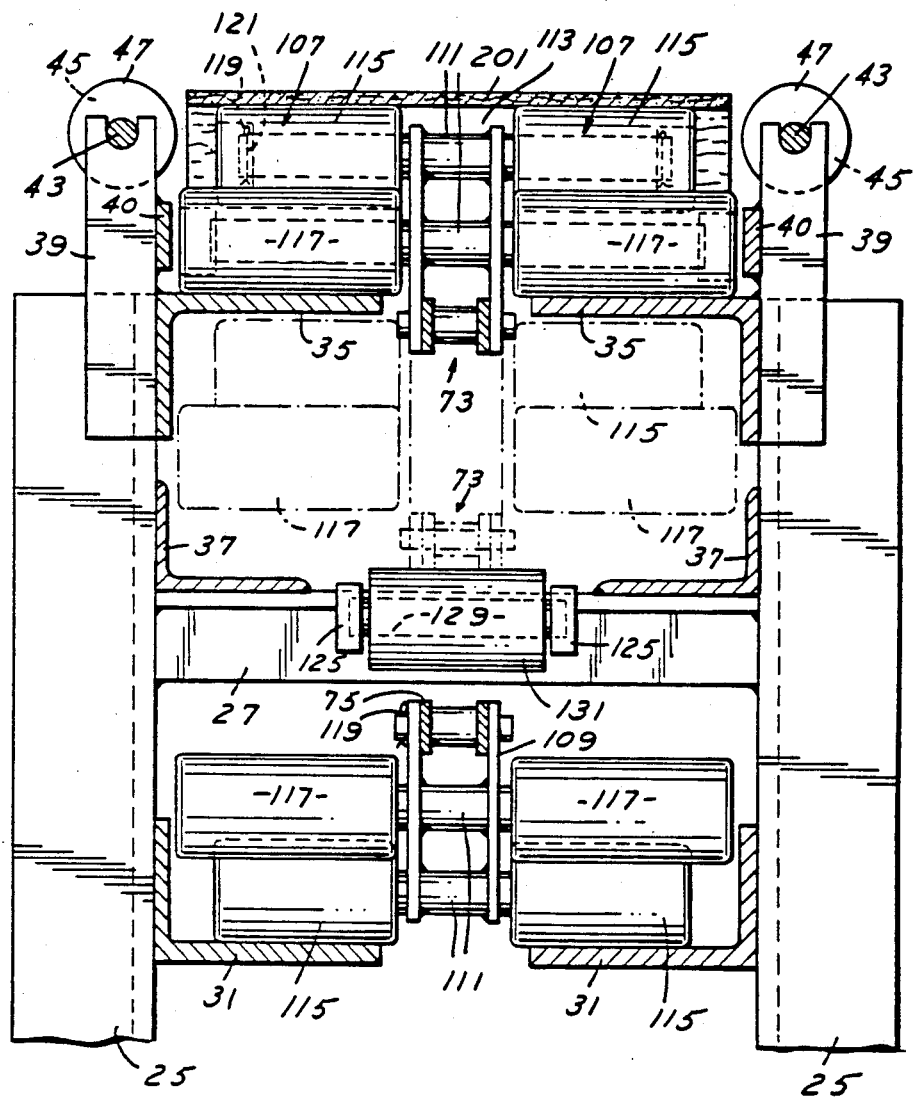
FIG. 7 is a fragmentary section taken in the direction of arrows 7—7 of FIG. 1, on an increased scale, illustrative of the up and normal low positions of the roller dollies.

As shown in FIGS. 12 through 15 corresponding supports 39 provide upon opposite sides of the framework a pair of spaced rows of longitudinally aligned notches 41 within which are nested bumper support rods 43 secured therein by the transverse anchor pins 45, FIG. 7. Elongated guide rollers 47 of a flexible material such as rubber, plastic, metal or other suitable material are mounted over the corresponding rods 43 and retained thereon along the length of the framework on opposite sides thereof above and adjacent the corresponding top plates 35.

Figure 4:
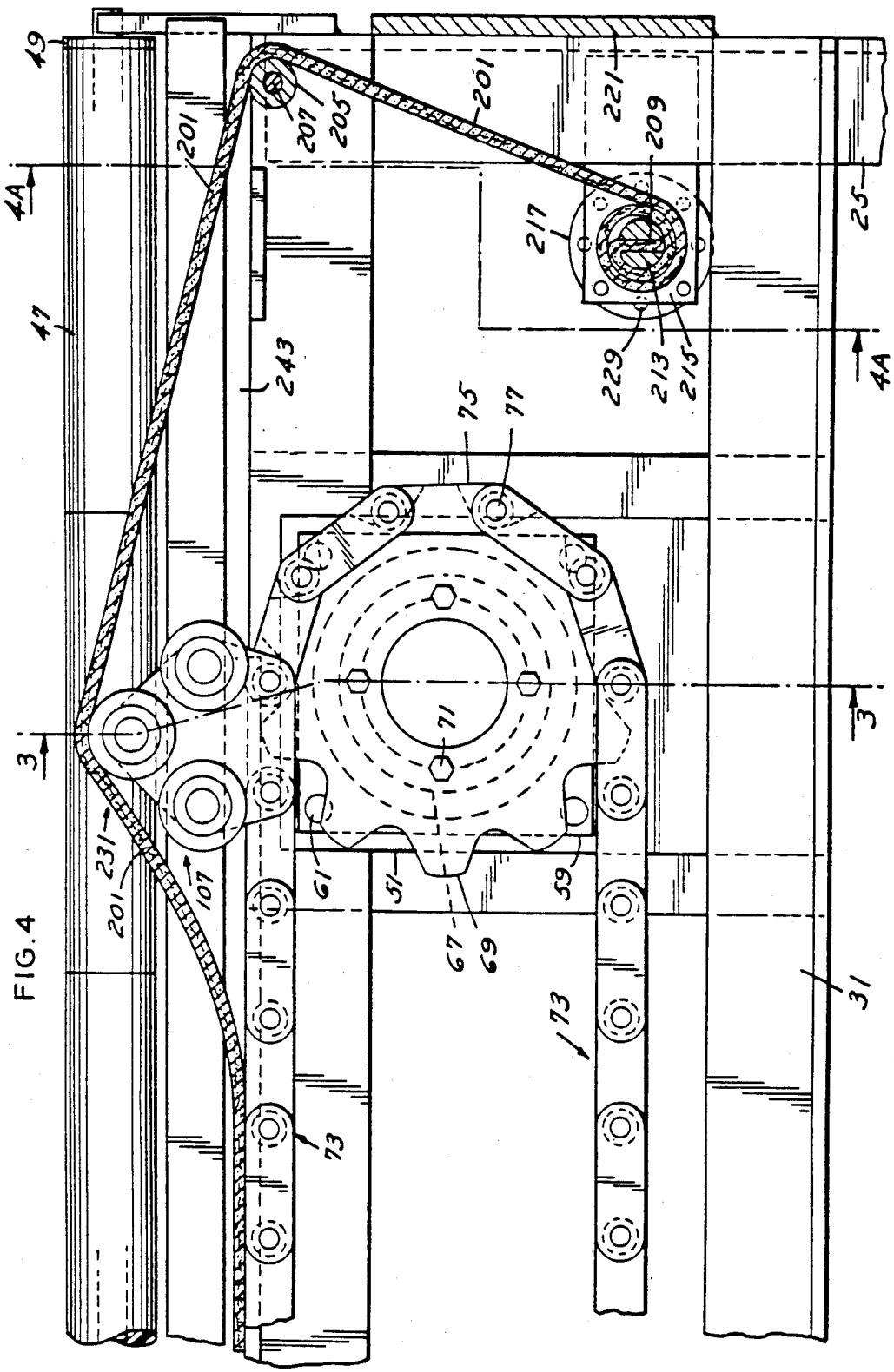
FIG. 4 is a fragmentary section taken in the direction of arrows 4—4 of FIG. 3.

Upright motor mount plate 51 is apertured at 53 and is mounted upon one side of the exit frame 17 shown in FIGS. 14 and 15 adapted to receive and mount hydraulic motor 55 and connected gear box 56 shown in FIGS. 1, 3 and 4. Flange 57 upon gear box 56 is mounted upon the outside of plate 51 and secured in position by the upright anchor plate 59 upon the opposite side of plate 51 by fasteners 61, FIG. 3.

Anchor plate 59 has mounted thereon upon the interior of the framework the journal 63 within which is supported the power rotated shaft 65 having a mount flange 67 axially secured by fasteners 71 to the drive sprocket 69.

Continuous sprocket chain 73 extends around drive sprocket 69 at the far end of the framework FIGS. 1, 3 and 4. The continuous sprocket chain 73 includes a plurality of opposed links 75 pivotally connected by pivot pins 77 and corresponding rollers adapted for registry with drive sprocket 69. The opposite end of the continuous sprocket chain is supported upon and around idler sprocket 79, FIGS. 1, 5 and 6.

Figure 5:
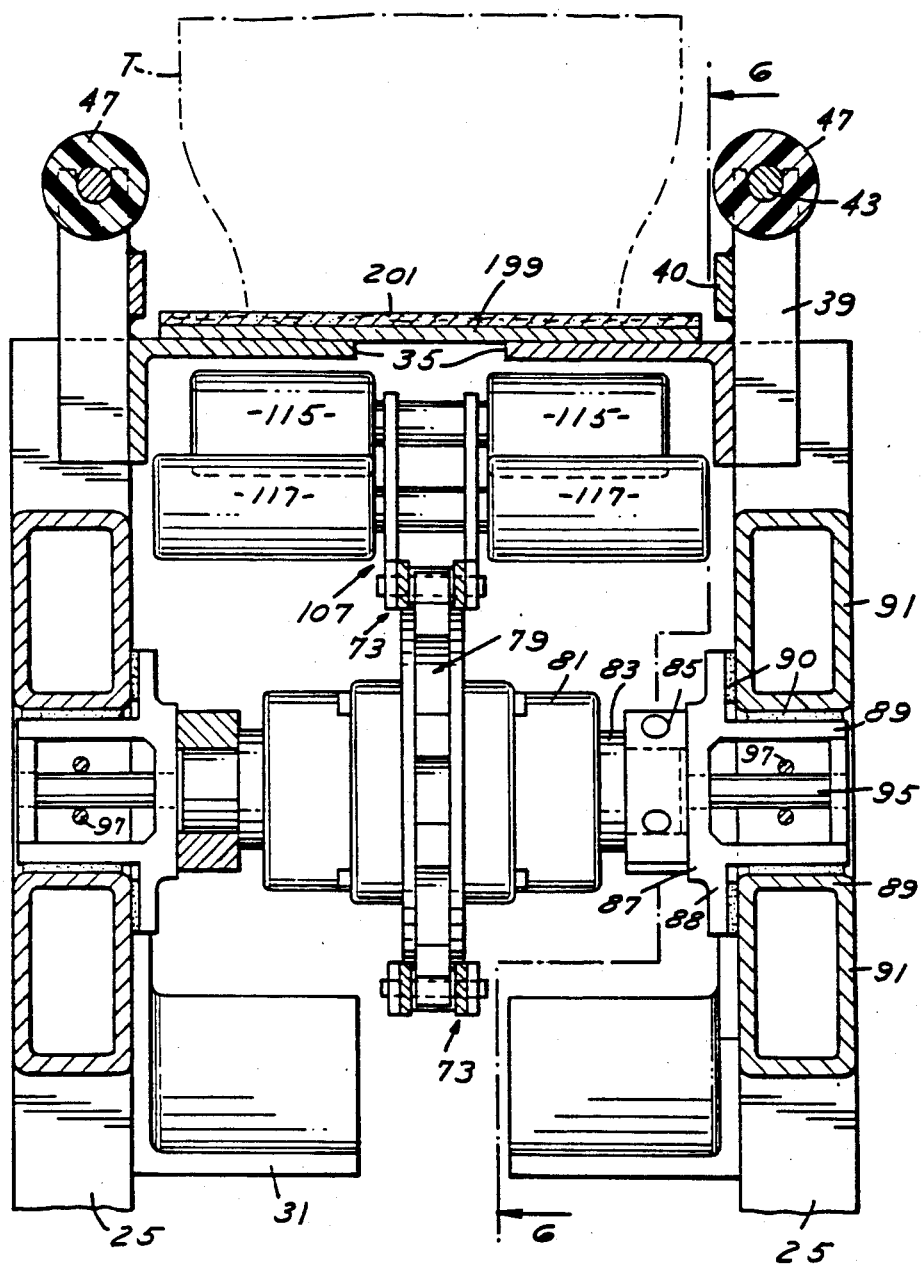
FIG. 5 is a fragmentary section taken in the direction of arrows 5—5 of FIG. 1, on an increased scale and illustrating the idler sprocket support for the conveyor chain.
Figure 6:
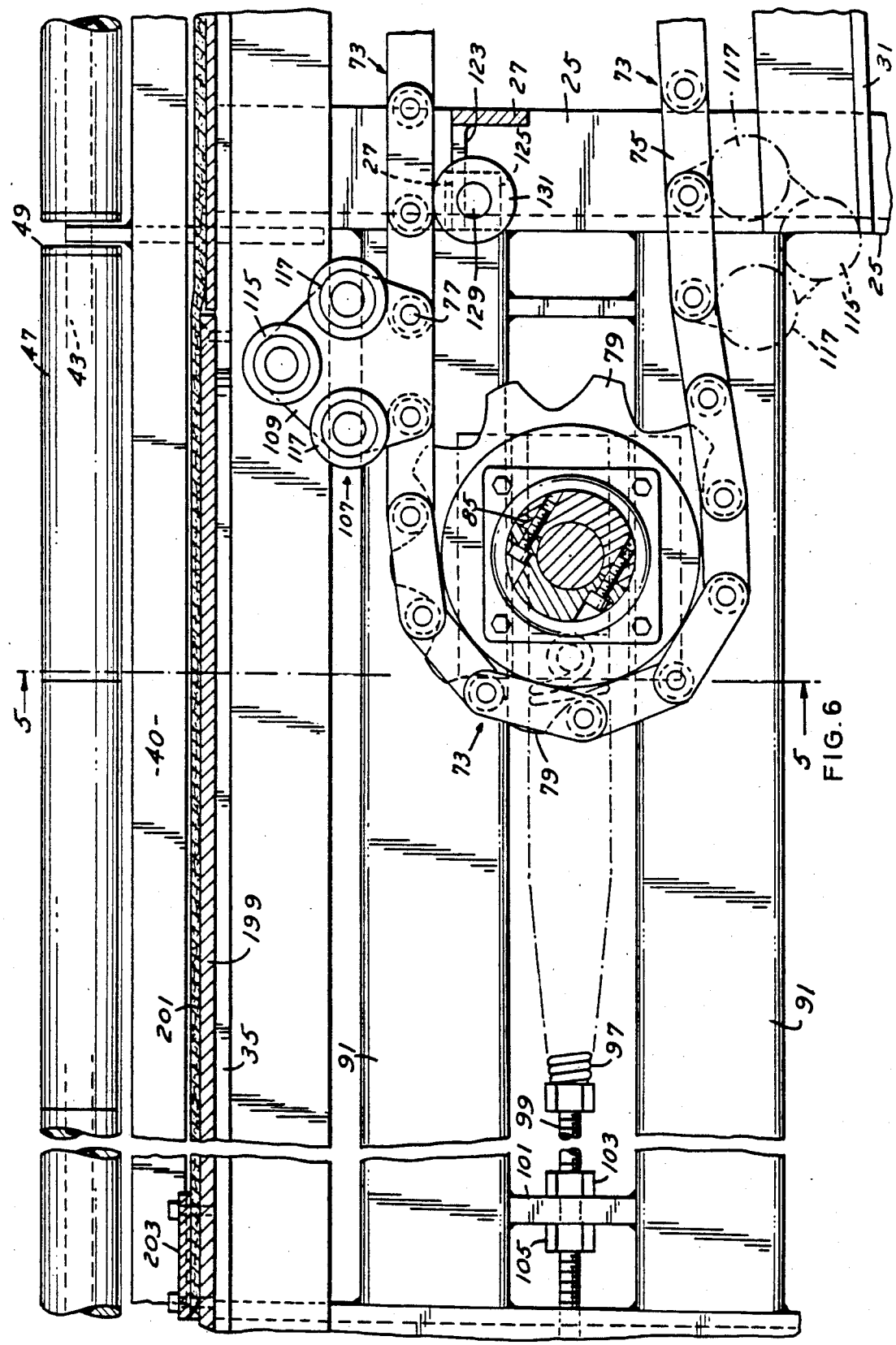
FIG. 6 is a fragmentary longitudinal section taken in the direction of arrows 6—6 of FIG. 5 illustrative of the yieldable mounting of the driven sprocket.

As shown in FIGS. 5 and 6, idler sprocket 79 includes upon opposite sides thereof and axially connected thereto the bearings 81 through which projects the transverse sprocket shaft 83 at its opposite ends mounted within the shaft housing and clamp 85.

The shaft housings 85 are mounted upon opposed spaced carriage blocks 87 having flanges 88 and the outwardly directed support channels 89 slidably and guidably supported between the corresponding horizontally disposed tubular guide beams 91. These form a part of the framework and are a part of the entrance frame 13, FIG. 12.

Suitable fiber or other wear pads 90 are interposed between axle support blocks 87 and the support channels 89 and the corresponding framework guide beams 91, FIG. 5. Within each of the blocks 87 and corresponding support channels 89 there is positioned the spring anchor pin 95 adapted to receive the respective one ends of the adjustable tension springs 97.

These springs are shown in further detail in FIG. 6 wherein one end of the spring 97 has retained thereon the adjustable anchor bolt 99 which extends through the upright pillar 101 between the channels 91. A lock nut 103 is threaded onto bolt 99 upon one side of the pillar 101 and a correspondence adjusting nut 105 is mounted on the bolt 99 on the other side of the pillar for regulating the tension within the corresponding springs 97.

Accordingly, the respective springs 97 upon opposite sides of the entrance frame 13 are arranged between the guide beams 91 and provide for tensioning at all times the driven sprocket 79 for maintaining the flexibility of the sprocket chain 73 thereon and for permitting elongation thereof between the centers of the respective drive and driven sprockets for the sprocket chain, with some of the roller dollies thereon deflected out of line upon the continuous upper run of the sprocket chain 73.

Mounted upon the sprocket chain 73 and along the length thereon are a series of opposed pairs of longitudinally spaced roller dollies 107 which are pivotally connected to the sprocket chain 73 and project outwardly thereof, FIGS. 5, 6 and 7. Each of the pairs of roller dollies 107 include upright apertured mount plates 109 pivotally interconnected at 77, FIG. 6, into and between the corresponding links 75 of the sprocket chain 73. Three equally spaced rollers 115 and 117 are mounted to plates 109. Rollers 115 and 117 substantially form an equilateral triangle with roller 115 forming the vertex and rollers 117 forming the base of the triangle. Plates 109 extend beyond rollers 117 in a direction opposite roller 115 for pivotal connection to chain 73 at 77. The connection at 77 is substantially parallel to rollers 117.

Roller shaft 111 projects through and spans the adjacent mount plates 109 and is secured thereto by the welds 113 and projects outwardly from opposite sides thereof. Opposed top rollers 115 preferably constructed of a suitable plastic material are journaled upon the outer ends of top roller shaft 111 and secured thereto as by the washer 121 and cotter pins 119, FIG. 7. The corresponding pivot pins 77 for the sprocket chain 73 are similarly anchored to the respective chain links by such corresponding cotter pins 119. The top rollers 115 form a part of the roller dollies 107 and are journaled and retained upon the outer ends of the corresponding roller shaft 111.

A pair of parallel spaced coplanar bottom roller shafts 111 of the same construction as the upper roller shafts span and project through the adjacent mount plates 109 and are similarly secured thereto as by the welds 113 and project from opposite sides of plates 109. Corresponding bottom rollers 117 are mounted upon the outer ends of the lower roller shafts 111 and are retained thereon at their outer ends by corresponding cotter pins 119 which extend through outer end portions of the shafts 111 retaining the rollers 117 against relative outward movement. A suitable washer 121 is interposed between the cotter pins 119 of the corresponding roller 117, FIG. 7.

Referring to FIGS. 6 and 7, transverse angles 123 project from cross plates 27 and mount at their ends, saddle blocks 125 having upwardly opening slots 127 within which are positioned the ends of the roller pins 129 for the rollers 131. These are preferably constructed of a suitable plastic material. Mounted upon the framework and arranged between the top plates 35 and the bottom plates 31 are a series of longitudinally spaced transverse rollers 131 over which the upper run of the conveyor sprocket chain 73 is movably positioned during continuous movement of the sprocket chain. The longitudinally spaced transverse rollers 131 provide the support for intermediate portions of the sprocket chain 73 along its length.

The corresponding longitudinally spaced pairs of roller dollies 107 projected from opposite sides of the lower run of the sprocket chain 73 include the opposed rollers 115 which are supportably and movably positioned upon the bottom plates 31, FIG. 7. For normal operation, absent the presence of a vehicle upon the platform or framework or top plates 35, the upper and lower runs of the sprocket chain 73 are movably positioned within the framework and between the corresponding drive and driven sprockets 69, 79 at opposite ends thereof. The upper and lower runs of the chain 73 are generally parallel except where the rollers 115 move up the ramp at the exit end to traverse the drive sprocket 69.

ELEVATOR ASSEMBLY

Figure 11A:
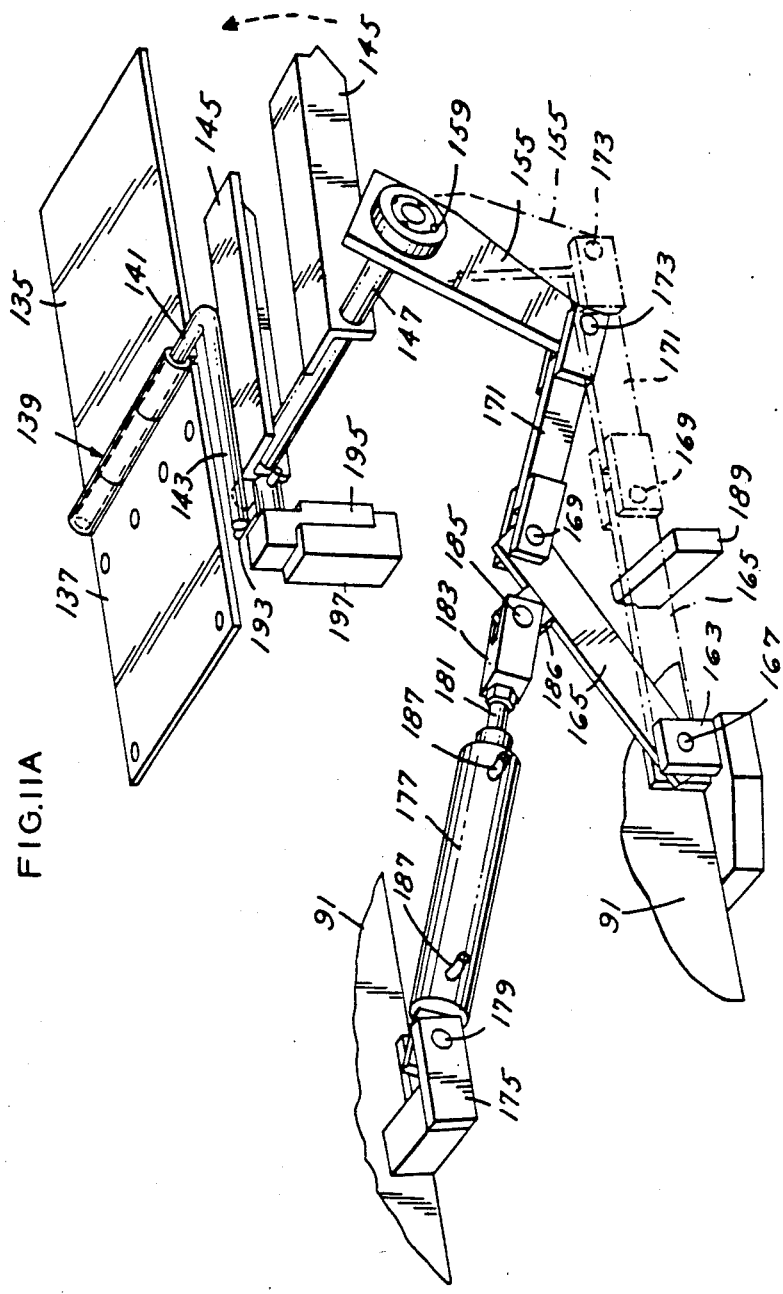
FIG. 11A is a fragmentary perspective view of the power operated elevator ramp, linkage and associated trap door, shown in solid lines and representing the elevator ramp in a horizontal position and shown in dotted lines and representing the elevator ramp in a raised position.

Referring to FIGS. 11 and 11A, within the framework entrance frame 13 in FIG. 12 there is formed within the opposed spaced top plates 35 an aperture 133. Normally closing the aperture 133 is a trap door 135, which at its rear transverse edge is hinged as at 139 by a hinge pin 141 to a mount plate 137. The plate 137 overlies and spans the corresponding top plates 35 and is secured by fasteners 138. Hinge pin 141 includes rearwardly extending hinge arm 143, FIG. 11A.

The present elevator ramp includes a pair of laterally spaced angles or ramp members 145 which underlie the corresponding top plates 35 and the ramp members at their rearward ends receive and are secured to a transverse mount shaft 147, FIGS. 11 and 11A. Shaft 147 at its ends is mounted upon the blocks 149 with bearings 151 interposed. The blocks 149 are mounted upon corresponding uprights 25 of the framework within the entrance section 13, FIG. 12.

Forwardly of the rock shaft 147 for the elevator ramps 145, there is arranged a transverse shaft 153 between uprights 25 which provides a secondary support for the elevator ramp 145 when in its lowermost position shown in dash lines in FIG. 11. This is sometimes referred to as a clearance position below the path of the top run of the sprocket chain 73 and the roller dollies 107 mounted thereon.

Figure 10:
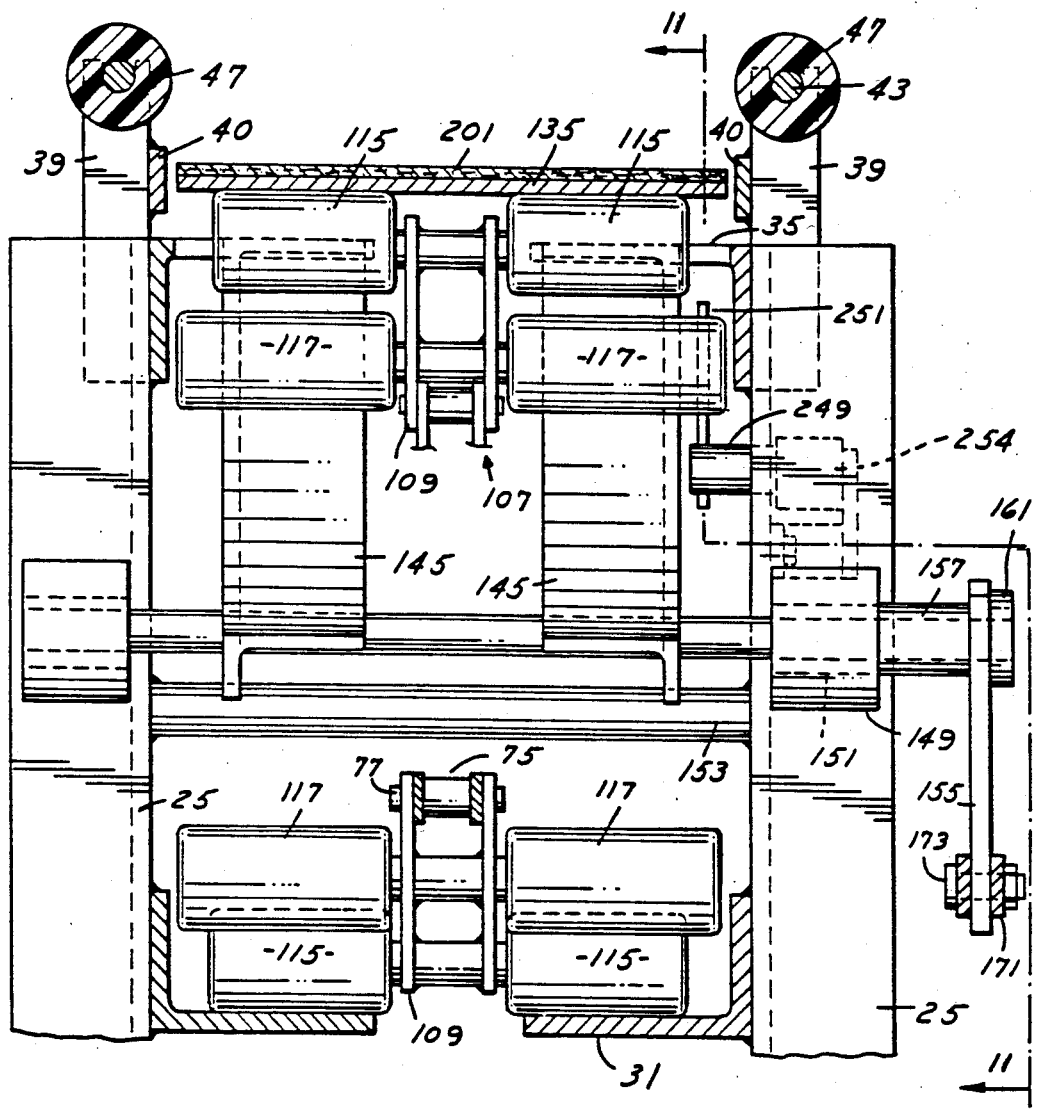
FIG. 10 is a fragmentary section taken in the direction of arrows 10—10 of FIG. 1, on an increased scale and illustrative of the elevator ramp.

Crank or lift arm 155 at one end is secured to the rock shaft 147 with the transverse sleeve 157, FIG. 10, secured to the crank arm 155 and mounted upon the ramp mount shaft 147. Anchor ring 161 is mounted upon the free end of the shaft 147 for retaining the shaft and sleeve 157 upon the end of shaft 147 with a locking key 159 interposed.

As shown in FIGS. 1, 11, 11A and 12 on one side of the framework, there is mounted upon guide beam 91, the clevis 163 for pivotally mounting at 167 the link 165. The link 165 at its other end is connected to the link 171 by the pivot pin 169. The other end of link 171 is pivotally connected by means of a clevis and pin 173 to the free end of crank arm 155. Mounted upon one of the side beams 91 forming a part of the framework, there is a clevis 175 which receives and has pivotally mounted thereon as at 179 the pneumatic cylinder 177. The cylinder 177 includes reciprocal piston rod 181, with the cylinder and rod sometimes referred to as a pneumatic cylinder assembly. The piston rod 181 at its free end has a clevis 183 pivotally connected at 185 to the short arm 186 secured upon the first link 165.

As shown in FIG. 11A, the cylinder assembly including the cylinder 177 has adjacent its opposite ends, the conventional pressure fittings 187 adapted to selectively and alternately receive fluid under pressure such as compressed air, for either advancing the piston rod 181 on application of pressure fluid to one of the fittings 187 and to retract the piston rod 181 on application of pressure fluid to the other fitting 187. A suitable control valve is connected to a source of compressed air and is adapted to alternately deliver compressed air to opposite ends of cylinder 177.

The car wash operator, after an automobile is approaching the entrance section of the conveyor assembly, actuates a control button which is effective to energize a solenoid controlled valve. As a result thereof, air under pressure is directed to one of the fittings 187 causing longitudinal outward advance of piston rod 181 moving the linkage 165, 171 and connected crank arm 155 to the extended position shown in FIG. 11 and by the dotted lines in FIG. 11A. Here the link 165 bears upon the transverse stop 189 upon the adjacent upright 25.

The foregoing linkage 165, 167, 169, 171, 173 and 155 is connected to the rock shaft 147 and to the cylinder assembly 177, 181 sometimes referred to as a power operated means and when energized, rotates the elevator ramp 145 from the horizontal clearance position shown in FIG. 11 to the solid line inclined position wherein the corresponding transverse stops 191 on the forward edges of the ramp angles 145 are in operative engagement with portions of the top plates 35 adjacent the first aperture 133 therein.

Referring once again to FIGS. 11 and 11A, it should be noted that vary little force is required to operate the power operated linkage system just described when compared with devices on the market. This is due to the fact that as the linkage arms 165 and 171 are pushed over center (from the solid line position of FIG. 11A) into a straight line, as represented by the dotted lines of FIG. 11A, such arms 165 and 171 act as a solid bar and requires very little force from the air cylinder 177 to hold it in position, with the elevator ramp 145 raised to the inclined position of FIG. 11. The ramp angles or members 145 are in the path of forward movement of the corresponding dollies 107 upon the upper side of the upper run of the sprocket chain 73. Therefore, during forward continuous feed movement in the direction of the arrows in FIG. 11, the sprocket chain 73 and the corresponding bottom rollers 117 of the dollies ride along the surfaces of the inclined ramp 145 guiding the dollies 107 through the aperture 133 and onto the top plates 35.

With the elevator ramp 145 in the dash line position FIG. 11, portions of the sprocket chain 73 would normally advance in a continuous straight path within the framework. With the elevator ramp 145 in the upwardly inclined solid line position, the corresponding opposed pair of roller dollies 107 are deflected upwardly and guide onto the top plates 35. This forms an angle 74 in the sprocket chain.

As shown in FIG. 11A as the trap door 135 is pivoted upwardly under the action or force of the top rollers 115 of the adjacent pair of dollies 107, the corresponding hinge arm 143 on the door hinge 141 rotates downwardly in a vertical plane past the wand 193 upon the limit switch 195 supported at 197 upon framework. As the corresponding pair of dollies 107 advance along the top plates 35, door 135 closes by gravity and the corresponding hinge arm 143 travels upwardly and triggers the wand 193 upon limit switch 195.

This limit switch 195 is set up internally to trigger in one direction and not the other. This then allows the corresponding dollies 107 to advance through the opening 133 within the top plates 135. This limit switch 195 is a cancel switch which in effect tells the ramp 145 to move from its inclined position downwardly to the clearance position. This would correspond to controlling a valve which directs fluid under pressure to the cylinder assembly 177 for delivering pressure fluid to the opposite fitting 187 causing a retraction of the piston rod 181. This would return the entire linkage 165, 171 to the solid line position shown in FIG. 11A. As the trailing dollie 107 passes over the elevator ramp members 145, it deflects the limit switch wand 251 of limit switch 254 (FIG. 10) and energizes the solenoid controlled valve to bring the third roller up. Thus as the third roller passes through the trap door 135, hinge arm 143 cancels all other rollers. When the operator activates the push button, you get the first roller and the third roller.

BELTING ASSEMBLY

Referring to FIGS. 1, 2, 3, 6, 7 and 9, applied across the rearward end of the entrance frame assembly 13 is a cover plate 199. Overlying the coverplate 199 is one end of an elongated flexible heavy duty belting 201 which, as an example, is constructed of PVC, rubber, plastic or other flexible material which has a certain amount of elasticity thereto. The one end of the belting 201 is positioned over the cover plate 199 and fixedly secured thereto by the overlying anchor plate 203 and corresponding fasteners, FIG. 6. The use of the belting 201 in the conveyor assembly is optional and is primarily designed to protect personnel from injury. The belting 201 forms a protective cover which will cover the openings and the conveyor chain of the assembly.

Figure 4A:
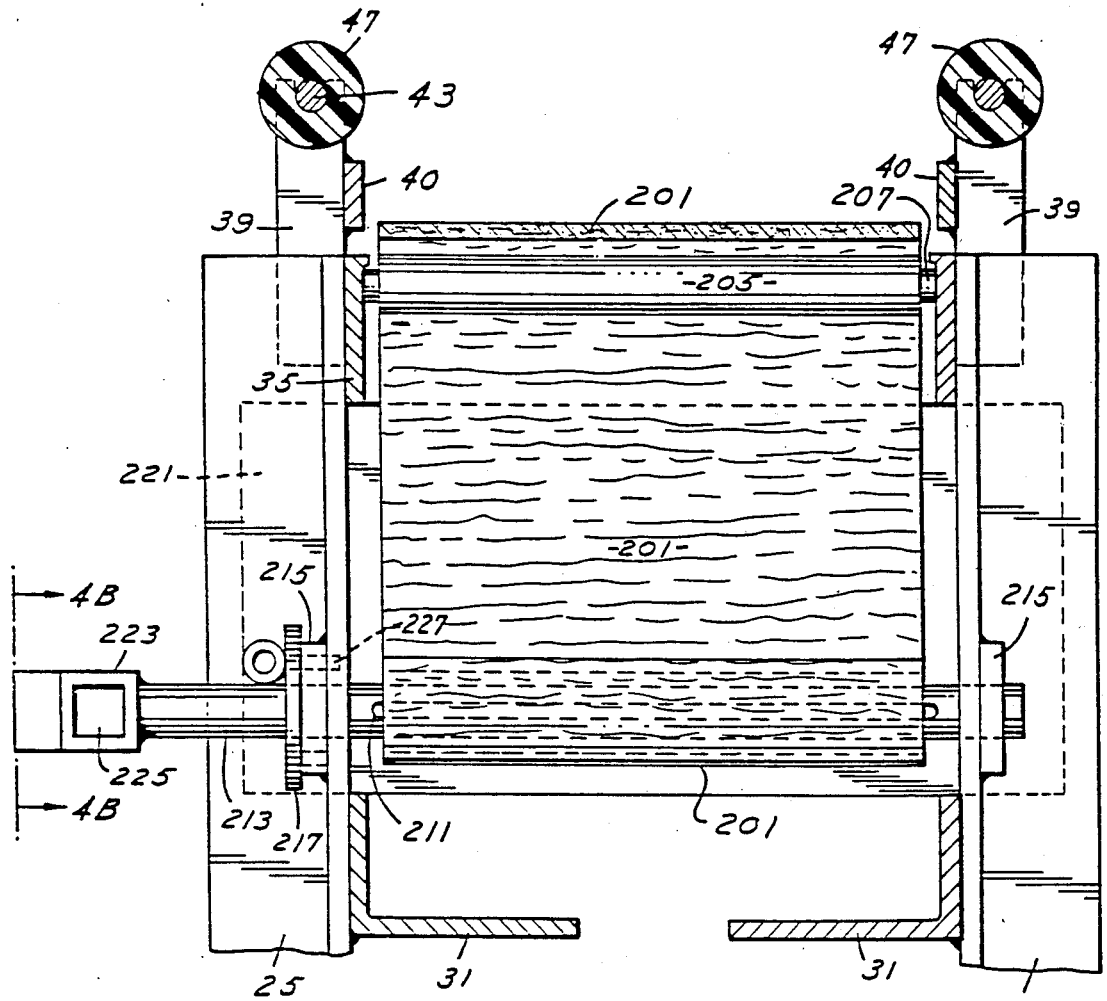
FIG. 4A is a fragmentary section taken in the direction of arrows 4A—4A of FIG. 4.
Figure 4B:
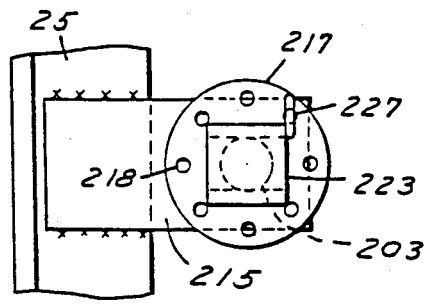
FIG. 4B is a fragmentary section taken in the direction of arrows 4B—4B of FIG. 4A.

The belting 201 extends along the complete length of the framework including the sections 13, 15 and 17 and at the far end of the framework extends around the transverse guide roll 205, FIG. 4A which spans the exit framework at its rear end. The roll 205 includes shafts 207 at the ends thereof secured upon the interior of the angle plates 35.

The flexible belting 201 guidably extends around pillow shaft 205 and the tongue end 209 thereof extends through the longitudinal slot 211 of the transverse tension adjusting axle 213, FIG. 4A. The axle 213 is supported upon the forwardly extending journal blocks 215 on the rear uprights 25, shown in FIG. 4. Mounted upon the tension adjusting axle 213 outwardly of the corresponding upright 25 is an anchor disc 217 having a series of peripheral spaced apertures 218 therein. The disc 217 is bolted at 227 to the mount or block 215.

An actuator block 223 having a square aperture 225 therethrough is secured upon the end of tension adjusting axle 213 providing for the application of a bar or tool for rotating the tension adjusting axle 213. This regulates the tension in belting 201 to the proper extent. Adjustable axle 213 and its corresponding anchor disc 217 is secured in position by the T-shaped lock pins or bolts 227 which extend selectively through the apertures 218 in the disc 217 and retainingly engage portions of actuator block 215.

In the operation of the belting 201 which is flexible and having some elasticity, from time to time it may be necessary to regulate the tension therein. This is accomplished by removing the lock pins or bolts 227 and rotating the axle 213 and thereafter locking the axle 213 in adjusted position by the lock pins 227.

Figure 8:
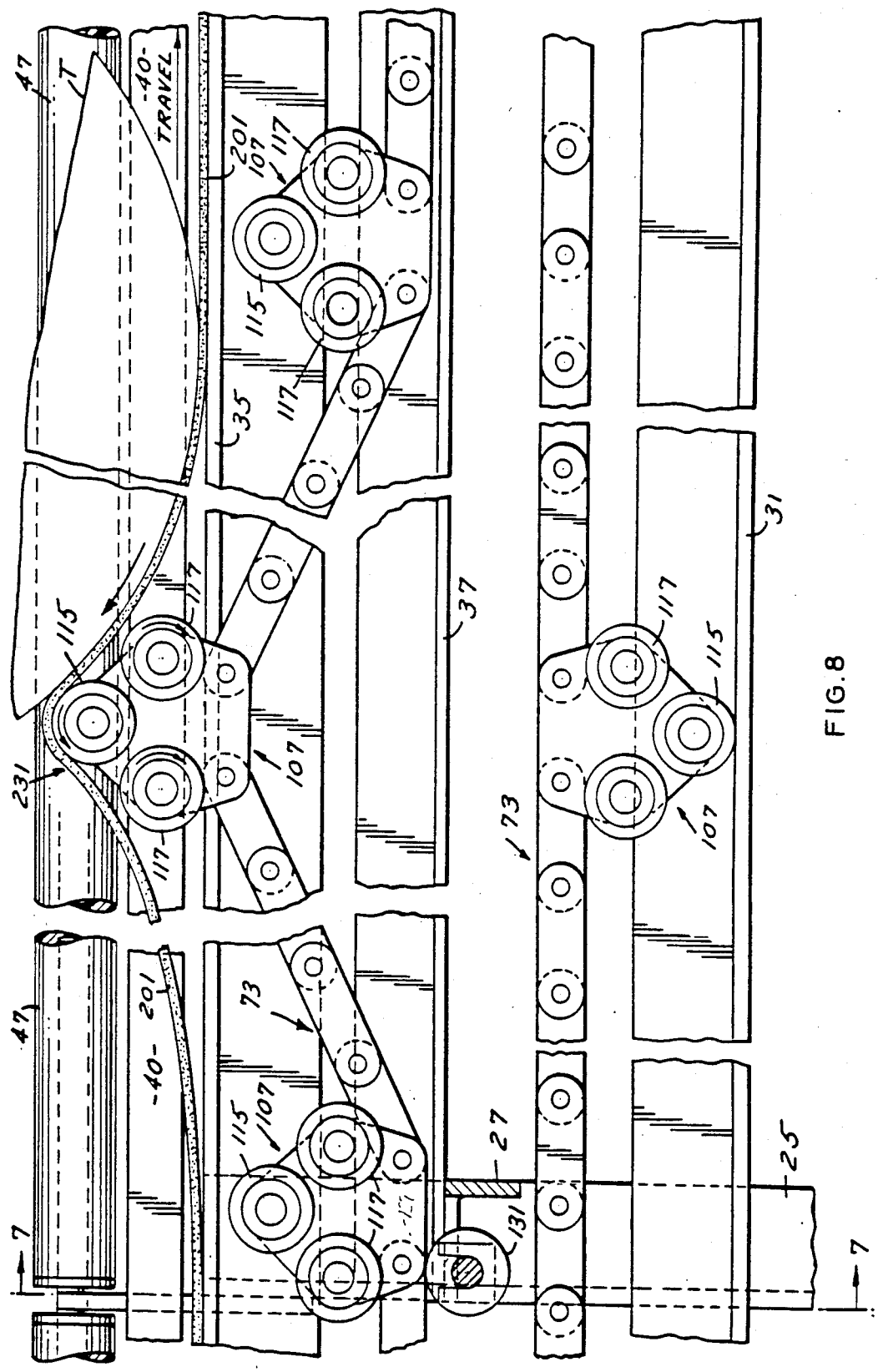
FIG. 8 is a fragmentary side elevational view upon an increased scale illustrating the elevated position of a roller dolly in engagement with a vehicle tire.

With the belting 201 under proper tension, on continued longitudinal movement of the elevated portions of the sprocket chain 73 and connected roller dollies 107, the top rollers 115 of the corresponding pair of dollies 107 operatively engage the undersurface of the belting 201, FIG. 8, defining in the belting 201 a transverse pusher wave 231 therein in operative sliding engagement with the front and rear tires T, fragmentarily shown, for advancing the automobile along the top plates 35 of the framework of the conveyor system 11.

Figure 9:
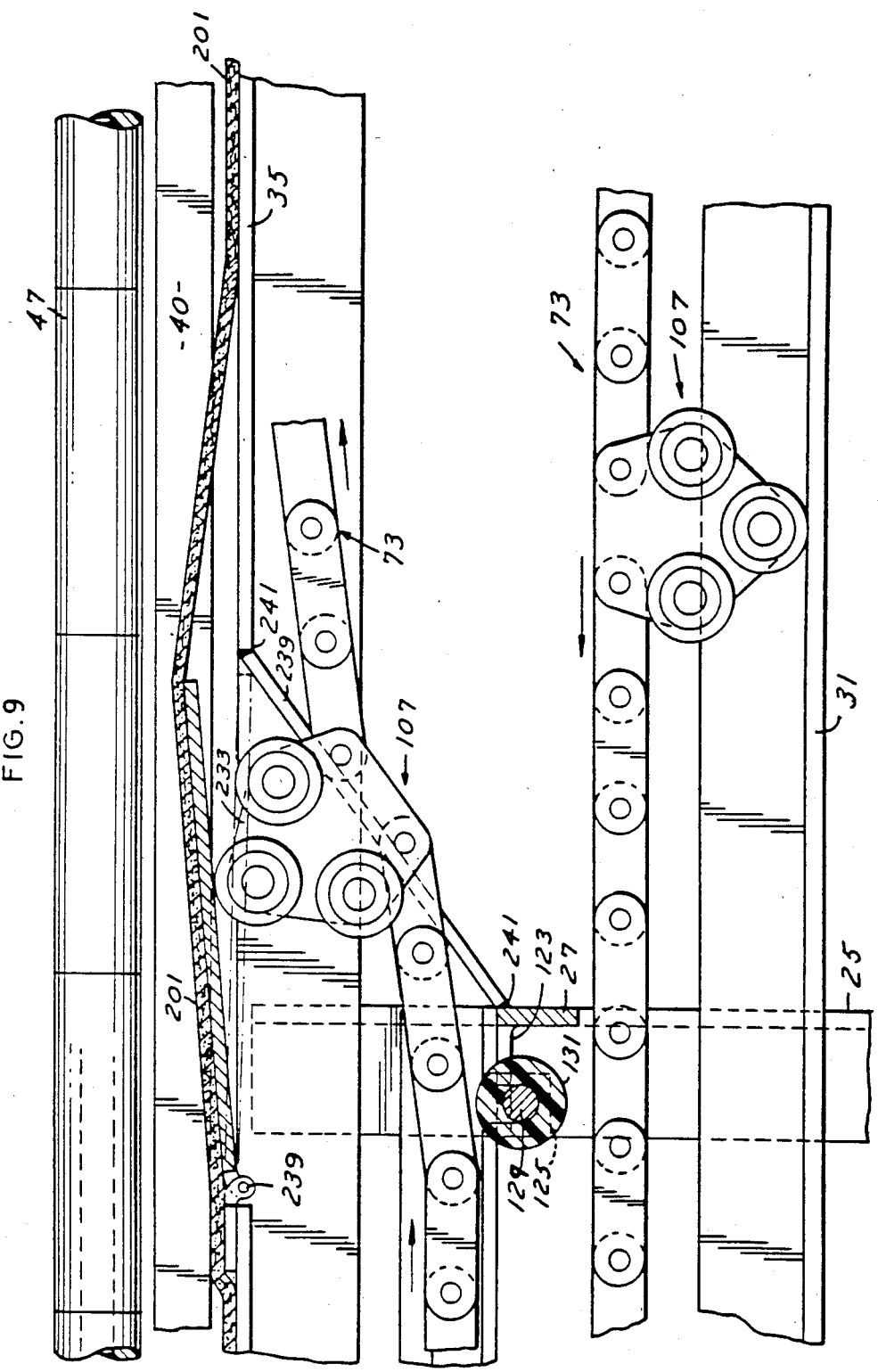
FIG. 9 is a partly sectioned side view on an increased scale taken in the direction of arrows 9—9 of FIG. 2 and illustrative of the fixed ramp.

Formed within the opposed top plates 35 within the exit section 17 of the framework as in FIGS. 1, 9 and 14, there is formed a second aperture 233 adjacent the exit end of the conveyor. Trap door 235 normally overlies and closes aperture 233 and at its rearward end is pivotally hinged as at 237 to the top plates 35. The forward end of the door 235 is supportably positioned upon the stationary ramp 239 which underlies aperture 233.

The upramp includes a pair of laterally spaced inclined plates or ramp members 239 welded at 241 at its respective ends to the adjacent cross plate 27 and a corresponding portion of top plates 35, FIG. 9. The ramp is in the paths of forward movement of the sprocket chain 73 and the connected opposed pair of roller dollies 107.

In operation all of the non-deflected dollies 107 arranged in pairs upon the upper side of the upper run of the sprocket chain 73 are deflected by the inclined ramp 239 so as to move from within the framework along the ramp 239 up and onto corresponding top plates 35 forwardly to the end of the exit ramp 17. Here they are successively positioned thereon for re-entry into the framework through aperture 243 around a drive sprocket 69, FIG. 4. Again the sprocket chain 73 is angularly deflected FIG. 9, changing the effective length of the sprocket chain 73 between the respective drive and driven sprockets. The driven sprocket 79 is yieldably mounted upon the framework to accommodate such extensions of the sprocket chain 73.

At the rearward end of the exit frame 17, there is formed an additional transverse dolly opening 243 through the top plates 35 through which the corresponding pairs of dollies 207 move downwardly as the sprocket chain 73 movably extends around the driven sprocket 69.

In operation, corresponding pairs of dollies 107, FIG. 4 move along and under the belting 201 entering the interior of the framework for movement upon the lower run of the sprocket chain 73. Here the corresponding top rollers 115 of the roller dollies 107 are supportably mounted upon the bottom plates 31 within the framework throughout the length thereof.

In conjunction with the power operated means, including the cylinder assembly 177, 181, a limit switch 245 is employed and is mounted upon one of the uprights 25, FIG. 11 adjacent the lead in of the entrance framework 13 of the conveyor. The switch 245 has a wand or spring biased control button 247 which underlies the mount plate 137. This limit switch 245 is suitably connected to a solenoid control valve or other control mechanism, not shown, for regulating the flow of fluid under pressure to the respective fittings 187 of the cylinder assembly 177, 181, FIG. 11A.

The limit switch assembly 245, 247 is connected into the cylinder assembly 177, 181 and provides a means by which fluid under pressure is directed to the cylinder assembly such as will advance the piston rod 181, FIG. 11A, from the position shown therein to an advanced position. Here the linkage 165, 171 is straightened out and supported upon the stop 189, FIG. 11. This advancing of the linkage is such as to rotate the crank 155 in a counter-clockwise direction causing a corresponding counter-clockwise rotation of the ramp 145 to the solid line position, FIG. 11. There is provided a push button assembly connected to the power operated assembly 177, 181 which is connected to the linkage 165, 171 and arm 155 effective, when activated, to rotate the elevator ramp 145 from its horizontal clearance position shown in dash lines to the solid line position of FIG. 11.

In operation after the corresponding opposed pair of dollies 107, FIG. 11 have advanced over the ramp angles 145 upwardly and onto the top plates 35 and the door 135, FIG. 11 has returned to its horizontal position by gravity, the corresponding arm 143 activates the wand 193 of a limit switch 195. This reverses the connections of the solenoid controlled valve which directs fluid under pressure to the opposite end of the cylinder assembly 177 causing a retraction of piston rod 181. This in turn will return the elevator ramp 145 to the dash line clearance position shown in FIG. 11.

There is shown in FIG. 10 the limit switch 249 mounted upon one of the uprights 25 upon the framework just forwardly of the elevator ramp 145. The switch 249 includes an upright wand 251 normally in the path of forward movement of the roller dollies 107. As the trailing dollie 107 passes over the elevator ramp members 145, it deflects the limit switch wand 251 of limit switch 254 (FIG. 10) and energizes the solenoid controlled valve to bring the third roller up. Thus as the third roller passes through the trap door 135, hinge arm 143 cancels all other rollers.

OPERATION

In the normal operation of a power operated sprocket chain 73 driven by the sprocket 69, the connected roller dollies 107 are spaced along the length of the upper and lower runs of the sprocket chain 73. Absent the presence of a vehicle to be moved over the conveyor assembly 11, the corresponding roller dollies on the top flight of the sprocket chain at all times move in a horizontal path entirely within the framework 13, 15 and 17. Just as soon as a vehicle approaches the entrance portion of the framework 13, the car wash operator actuates a control button which directs a signal to the solenoid controlled valve 245 which, when activated, operates the cylinder assembly and elevates one of the dollies 107 to a position so that it is movably mounted upon the top plates 35. The elevator ramp 145 moves from the clearance position, FIG. 11, to the inclined position in the path of forward movement of the corresponding dollies 107. This causes that particular pair of opposed roller dollies to move upwardly along the elevator ramp 145 and onto the top plates 35. In view of the operation of the limit switch 195, FIG. 11A, just as soon as the door 135 is closed by gravity after the pair of dollies has moved through the aperture 133, there will be such reversal in the connections to the cylinder assembly as will retract the piston rod 181 causing the ramp 185 to move to the clearance horizontal position shown in FIG. 11A. As the trailing dollie 107 passes over the elevator ramp members 145, it deflects the limit switch wand 251 of limit switch 254 (FIG. 10) and energizes the solenoid controlled valve to bring the third roller up. Thus as the third roller passes through the trap door 135, hinge arm 143 cancels all other rollers. All of the succeeding roller dollies and sprocket chains will continue upon the rollers 131 within the framework unless and until another vehicle approaches the conveyor assembly and the operator activates the control button as explained previously. This will then cause a further deflection of the approaching pair of roller dollies 107 such that they will ride up the inclined ramp 145 or elevator onto the top plates 35 in order to operatively engage the next succeeding front and rear tire of a vehicle for rolling the same along the framework or top plates thereof.

Thus it appears that in the operation of the present conveyor assembly of FIGS. 1–5 inclusive, some of the pairs of roller dollies will be movably mounted upon the top plates 35 and additional roller dollies and connected chain 73 will be supportably mounted upon the transverse intermediate rollers 131 within the framework.

This means that depending upon the number of roller dollies deflected, in effect the sprocket chain has lengthened to a limited extent between the respective drive and driven sprockets. The spring tensioned yieldable mounting for the idle sprocket 79 is effective to compensate for such extensions of the sprocket chain. The angular deflections in the sprocket chain 73 only effect the upper run of the sprocket chain 73 moving in the direction of the arrows.

The primary function of the optional belting 201, in addition to providing the transverse wave for operatively engaging the front wheel of a vehicle for moving it along the top plates of the framework is that it protectively encloses the entire sprocket chain assembly including the opposed pairs of roller dollies connected thereto and top plates to provide a protective cover to prevent personal injury to the car wash personnel and to protect the enclosed mechanism from dirt and moisture during operation of the conveyor assembly.

MODIFIED AUTOMOBILE CONVEYOR

The automobile conveyor 11 described previously in connection with the embodiment illustrated in FIGS. 1–15 inclusive, includes at the entrance end of the conveyor an "on-demand feature" which senses or is programmed or designed to operate the movable entrance ramp 145 so as to direct the roller dollies 107 of the chain 73 on to the upper plates 35 of the conveyor.

The automobile conveyor 11' as illustrated in FIGS. 16–19 inclusive represents an "all rollers up" type of conveyor assembly. It does not include the "on-demand" feature as in the other embodiment. In describing the modified conveyor 11' the same numerals are used to indicate similar parts and components.

Figure 18:
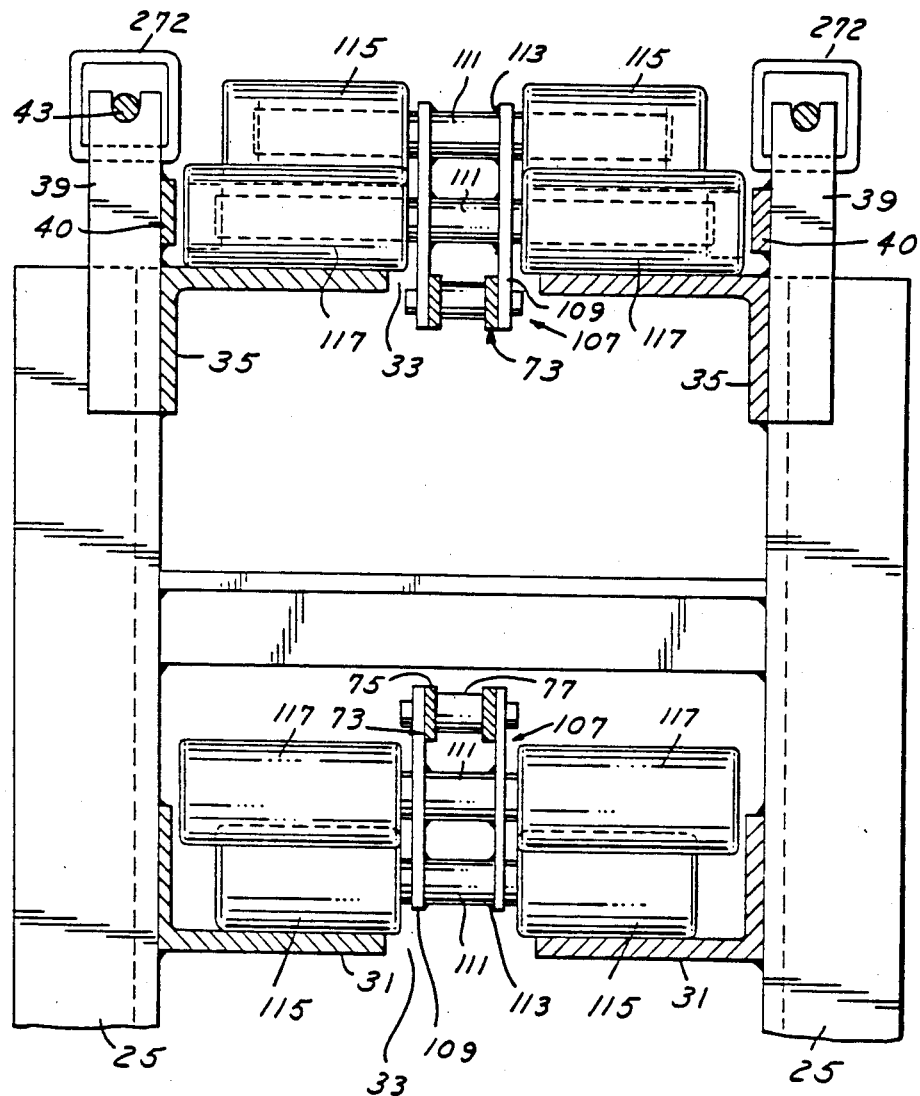
FIG. 18 is a fragmentary section taken in the direction of arrows 18—18 of FIG. 16, on an increased scale, illustrative of the upper and lower positions of the roller dollies.

The modified automobile conveyor 11' does not include the intermediate angles or plates 35 which extend from one end of the conveyor to the other or the rollers 131 for supporting the conveyor chain 73. The entrance elevator ramp 270 is welded in place (FIG. 19) so as to bring all rollers up through the provided opening 133 in the top plate 35. Thus no cylinder or elevator ramp mechanism of the type shown in FIG. 11A is provided. Since the conveyor roller dollies 107 are always up or down, no exit ramp 239 and trap door assembly are provided. The differences between the two embodiments are shown by comparing the following drawings: FIGS. 1 and 16; FIGS. 2 and 17; FIGS. 7 and 18; and FIGS. 11 and 19.

The "all rollers up" automobile conveyor 11' is shown in FIGS. 16 and 17 over which is movably positioned the automobile A shown in dash lines having a tire T movably mounted upon the top plates 35 of the framework. The conveyor includes the entrance section 13, intermediate section 15, and the exit section 17. All sections are nested within the pit 21 having a floor and conventional side walls arranged adjacent the floor surface F over which vehicle A is movably positioned. The conveyor sections 13, 15 and 17 are generally constructed and arranged as in the first embodiment except for where certain angles and brackets are not required due to the elimination of certain components as noted herein and as shown in the drawings.

Entrance section 13 includes a pair of opposed channel uprights 23 and longitudinally spaced therefrom, forming a part of the framework sections 13, 15 and 17, are opposed pairs of uprights 25 mounted upon the pit floor 21. Spanning the respective uprights 23 and 25 are longitudinally spaced cross plates 27 intermediate the top and bottom of the framework. The lower ends of the uprights 23–25 are interconnected by cross members or rods, now shown.

Each of the framework sections 13, 15 and 17 include along their opposite sides and interconnecting the uprights 23–25 opposed bottom support angles 31 sometimes referred to as bottom plates or bottom support plates spaced apart throughout the length of the framework as shown at 33, FIG. 18, providing a clearance for the centrally arranged endless sprocket chain 73. Extending along the upper portions of the framework including the sections 13, 15 and 17 are the opposed spaced top support angles 35, sometimes referred to as spaced top plates similarly spaced apart as shown at 33 (FIG. 18) over which is movably positioned the tire T of the automobile A for transfer thereover.

Mounted upon the upper ends of the respective uprights 23, 25 are opposed spaced pairs of rod supports 39 longitudinally interconnected upon opposite sides of the framework throughout the length thereof by the reinforcement plates or toe guard 40. The supports have upwardly opening notches 41. The supports 39 provide upon opposite sides of the framework a pair of spaced rows of longitudinally aligned notches 41 within which are nested bumper support rods 43. Elongated tubular metal guide elements 272 of rectangular cross-section, made, as an example, from steel or other suitable material are mounted over the corresponding rods 43 and retained thereon along the length of the framework on opposite sides thereof above and adjacent the corresponding top plates 35.

A motor mount plate is provided at the exit end of the conveyor and receives and mounts the hydraulic motor 55 and connected gear box 56. An anchor plate, not shown, has mounted thereon upon the interior of the framework the journal 63 within which is supported the power rotated shaft 65 of FIG. 3 having a mount flange 67 axially secured by fasteners 71 to the drive sprocket 69 shown in FIGS. 16 and 17. Continuous sprocket chain 73 extends around drive sprocket 69 at the far end of the framework. The continuous sprocket chain 73, as in the other embodiment, includes a plurality of opposed links 75 pivotally connected by pivot pins 77 and corresponding rollers adapted for registry with drive sprocket 69. The opposite end of the continuous sprocket chain is supported upon and around idler sprocket 79, FIGS. 16 and 17. The idler sprocket 79 is mounted in the framework as described previously for the other embodiment. The mounting includes the guide beams 91 and tension springs 97.

Accordingly, the respective springs 97 upon opposite sides of the entrance frame 13 are arranged between the guide beams 91 and provide for tensioning at all times the driven sprocket 79 for maintaining the flexibility of the sprocket chain 73 thereon and for permitting elongation thereof between the centers of the respective drive and driven sprockets for the sprocket chain.

Mounted upon the sprocket chain 73 and along the length thereon are a series of opposed pairs of longitudinally spaced roller dollies 107 which are pivotally connected to the chain 73 and project outwardly thereof as shown in FIG. 18. Each of the pair of roller dollies 107 include upright apertured mount plates 109 pivotally interconnected at 77 into and between the corresponding links 75 of the sprocket chain 73.

Roller shaft 111 projects through and span the adjacent mount plates 109 and is secured thereto by the welds 113 and projects outwardly from opposite sides thereof. Opposed top rollers 115 preferably constructed of a suitable plastic material are journaled upon the outer ends of top roller shaft 111 and secured thereto as by the washer 121 and cotter pins 119 as shown previously. The corresponding pivot pins 77 for the sprocket chain 73 are similarly anchored to the respective chain links by such corresponding cotter pins 119. The top rollers 115 form a part of the roller dollies 107 and are journaled and retained upon the outer ends of the corresponding roller shaft 111.

A pair of parallel spaced coplanar bottom roller shafts 111 of the same construction as the upper roller shafts 111 span and project through the adjacent mount plates 109 and are similarly secured thereto as by the welds 113 and project from opposite sides of plates 109. Corresponding bottom rollers 117 are mounted upon the outer ends of the lower roller shafts 111 and are retained thereon at their outer ends by corresponding cotter pins which extend through outer end portions of the shafts 111 retaining the roller 117 against relative outward movement. As in the first embodiment, a suitable washer is interposed between the cotter pins of the corresponding roller 117.

With the aforementioned construction the conveyor chain 73 is movably mounted upon the framework and arranged between the top plates 35 and the bottom plates 31. No intermediate plates or angles and rollers 131 are provided as in the other embodiment. The longitudinally spaced pairs of roller dollies 107 projected from opposite sides of the lower run of the sprocket chain 73 include the opposed rollers 115 which are supportably and movably positioned upon the bottom plates 31. For normal operation, the upper and lower runs of the sprocket chain 73 are movably positioned within the framework and between the corresponding drive and driven sprockets 69, 79 at opposite ends thereof. The upper and lower runs of the chain 73 are generally parallel except where the dollies move up the fixed ramp 270 and around the sprockets. Within the framework entrance section 13 in FIG. 19 there is formed within the opposed spaced top plates 35 an aperture 133. Normally closing the aperture 133 is a trap door 135, which at its rear transverse edge is hinged as at 139 to a mount plate 137. The plate 137 overlies and spans the corresponding top plates 35 and is secured by fasteners 138. The door 135 is opened by a roller dolly 107, FIG. 19, and is closed by gravity.

The present elevator ramp includes a pair of laterally spaced, stationary angles or ramp members 270 which underlie the corresponding top plates 35. The ramp members are welded in place as shown at 271. All roller dollies 107 are guided up the stationary ramp. No "on demand" feature is provided.

In operation, the ramp angles or members 270 are in the path of forward movement of the corresponding dollies 107 upon the upper side of the upper run of the sprocket chain 73. Therefore, during forward continuous feed movement the sprocket chain 73 and the corresponding bottom rollers 117 of the dollies ride along the surfaces of the inclined ramp 270, opening the trap door 135 and guiding the dollies 107 through the aperture 133 and onto the top plates 35 as shown in FIG. 19. As the corresponding pair of dollies 107 advance along the top plates 35, door 135 closes by gravity.

The conveyor chain 73 is primarily used without the belting 201 described previously.

At the rearward end of the exit frame 17, there is provided the dolly opening 243 through the top plates 35 through which the corresponding pairs of dollies 207 move downwardly as the sprocket chain 73 movably extends around the driven sprocket 69.

In the operation of the modified conveyor assembly of FIGS. 16–19 inclusive, the pair of roller dollies 107 will be movably mounted upon the top plates 35 and the other roller dollies and connected chain 73 will be movably mounted upon the lower plates 31 within the framework. No intermediate plates and rollers are provided as in the other embodiment. Thus when the conveyor is energized, the endless chain 73 moves in the same generally circular or endless path at all times, with certain of the dollies 107 being up or raised and the other dollies down.

The conveyor 11' therefore represents an "all rollers up" type of conveyor and does not include any "on-demand" feature. Since the entrance ramp members 270 are welded or fixed in place no ramp operating mechanism including pneumatic cylinders, linkage mechanism and limit switches are required. The conveyor chain 73 may be used with or without a protective belting of the type described previously. Thus the framework of conveyor 11' is simplified when compared to the framework of conveyor 11 since certain support angles, plates, rollers, bearings, switches, cylinders etc. are not required.

Having described our invention, reference should now be had to the following claims:

We claim:

1. In an automobile conveyor having an elongated framework including a pair of spaced top plates for supporting the tire of an automobile movable thereover, an endless sprocket chain having upper and lower runs movably positioned within said framework below said top plates and extending around drive and driven sprockets within and adjacent opposite ends of said framework; and
   a plurality of roller dollies within said framework spaced along the length of, connected to and projecting outwardly of said sprocket chain;
   the improvement comprising each of said roller dollies including at least one upright mounting plate connected to said sprocket chain supporting three equally spaced rollers, said rollers substantially forming an equilateral triangle with one roller forming the vertex of said triangle and adapted to operatively engage said automobile and with the other two rollers being coplanar forming the base of said triangle and adapted for supported movement upon the surface of said top plate; said mounting plate extending beyond said other two rollers in a direction opposite the vertex of said triangle and having laterally spaced fastening means for attaching said mounting plate to said chain, said fastening means being parallel to said other two rollers;
   a pair of bottom plates spaced below and extending in the same direction as said top plates;
   first and second apertures in said top plates at opposite ends of said framework adapted to receive said roller dollies;
   an elevator ramp mounted upon said framework and underlying said first aperture below said top plates;
   said ramp being located in the path of forward movement of said roller dollies for guiding said roller dollies through said first aperture onto said top plates for advancing movement thereon to operably engage the automobile tire; and
   said second aperture being located to receive said roller dollies after said roller dollies have separated from the automobile tire and to direct said roller dollies and chain onto said bottom plates.

2. In the conveyor of claim 1, wherein said roller dollies include a pair of laterally spaced mounting plates positioned on opposite sides of said chain;
   a top roller shaft extending transversely through and connected to said mounting plates extending outwardly thereof;
   top rollers journaled upon said top roller shaft adapted to operatively engage the automobile tire;
   a pair of coplanar bottom roller shafts extending transversely through and connected to said mounting plates extending outwardly thereof;
   and bottom rollers journaled upon said bottom roller shafts adapted for support movement upon said top plates;
   said top rollers when depending from the bottom run of said chain being adapted to supported movement upon said bottom plates.

3. In the conveyor of claim 2, said elevator ramp including a pair of spaced ramp plates respectively underlying said top plates, the roller dollies being adapted for engagement with and upward movement along the respective ramp plates.

4. In the conveyor or claim 1, each of said dollies including an upright mounting plate pivotally connected to the sprocket chain;
   a top roller extending transversely of and journaled upon said mounting plate adapted to operably engage the automobile tire;
   and a pair of coplanar bottom rollers extending transversely of and journaled upon said mounting plate adapted for supported movement upon a top plate.

5. In the conveyor of claim 4, wherein said top roller when depending from the bottom run of said conveyor is adapted for supported movement upon a bottom plate.

6. In the conveyor of claim 1, said second aperture in said top plates being located adjacent said drive sprocket with said roller dollies moving from the top plates downwardly through said second aperture as the connected sprocket chain travels around said drive sprocket.

7. In the conveyor of claim 1, a trap door overlying and normally closing said first aperture, at its rear edge pivotally mounted upon and spanning said top plates, upward movement of said roller dollies tilting said door upwardly to permit passage of said roller dollies through said first aperture, said trap door closing by gravity.

8. In the conveyor of claim 1, said driven sprocket being yieldably mounted upon said framework;
   said mounting including a sprocket shaft extending through said driven sprocket;
   a pair of laterally spaced bearing supports guidably mounted for longitudinal movement upon said framework and receiving opposite ends of said sprocket shaft;
   and spring means at one end adjustably mounted upon said framework and at their other ends connected in tension to said bearing supports, to accommodate length variation of said sprocket chain during deflection thereof.

9. In the conveyor of claim 1, said framework including an entrance section, an intermediate section and an end section arranged in a line and interconnected;
   said sections having a series of spaced, opposed uprights supporting said framework;
   upright rod supports extending from the upper ends of said uprights, the rod supports on each side of the framework having aligned upwardly opening notches, there being a row of notches on each side of said framework;
   continuous rods extending along and interconnecting and nested within each row of notches and secured therein;
   a series of guide tubes mounted upon said rod end to end along opposite sides of said framework above and adjacent the outer edges of said top plates.

* * * * *